United States Patent [19]

Yaginuma et al.

[11] Patent Number: 5,323,433
[45] Date of Patent: Jun. 21, 1994

[54] APPARATUS FOR ARRANGING SHORT CYLINDRICAL BODIES

[75] Inventors: Yoshitaka Yaginuma; Yoji Koike, both of Tohkai, Japan

[73] Assignee: Asahi Kogaku Kogyo Kabushiki Kaisha, Tokyo, Japan

[21] Appl. No.: 107,369

[22] Filed: Aug. 17, 1993

[30] Foreign Application Priority Data

Aug. 19, 1992 [JP] Japan .................................. 4-220486

[51] Int. Cl.$^5$ ............................................. G21C 21/02
[52] U.S. Cl. ...................................... 376/261; 34/109; 53/504
[58] Field of Search .................. 376/261, 260, 245; 34/109, 184, 186, 187; 53/504; 29/723, 906

[56] References Cited

U.S. PATENT DOCUMENTS 4,125,577 11/1978 Bezold .................................. 376/264
4,193,502 3/1980 Marmo .................................. 376/261
5,019,326 5/1991 Yaginuma et al. .................... 376/261

FOREIGN PATENT DOCUMENTS 0038378 10/1981 European Pat. Off. .
0343411 11/1989 European Pat. Off. .
2174631 10/1973 France .
2337882 8/1977 France .
0193461 9/1986 France .
2638983 5/1990 France .
2667433 4/1992 France .
2251973 7/1992 United Kingdom .

Primary Examiner—Daniel D. Wasil
Attorney, Agent, or Firm—Sandler, Greenblum & Bernstein

[57] ABSTRACT

An apparatus is presented for drying wet ground fuel pellets for nuclear reactors, inspecting the surface quality of the pellets, and loading the inspected pellets on a tray for storage. The pellets are discharged from a wet grinder, and are charged one at a time into pellet pockets formed at the periphery of a rotation disc, with the pellet axis aligned in the direction of transport. The rotation disc changes the transport direction from an axial direction to a radial direction, at right angle to the pellet axis. The rotation disc is provided with a gas circulation device, which delivers a flow of air from in-ports to edge surfaces of the pellets and discharges the air from out-ports. The direction of the air flow is alternated so that both end surfaces of the pellets will be dried completely. The underside of the pellets is also dried by an air flow directed to the pellets from gas outflow port disposed at the bottom region of the pellet pocket. The end surfaces and the side surface of each dried pellet are inspected in the pellet inspection section by image processing techniques, and the machine-inspected pellets are further examined visually in the visual confirmation section. The inspected pellets are loaded onto a tray, and are stored in the tray storage rack.

17 Claims, 18 Drawing Sheets

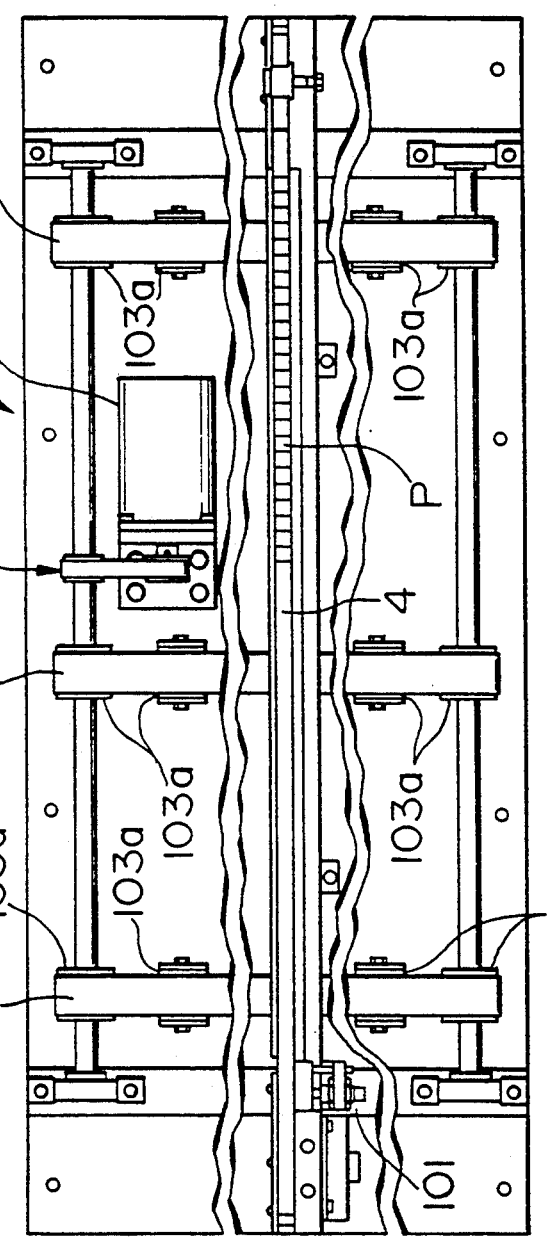
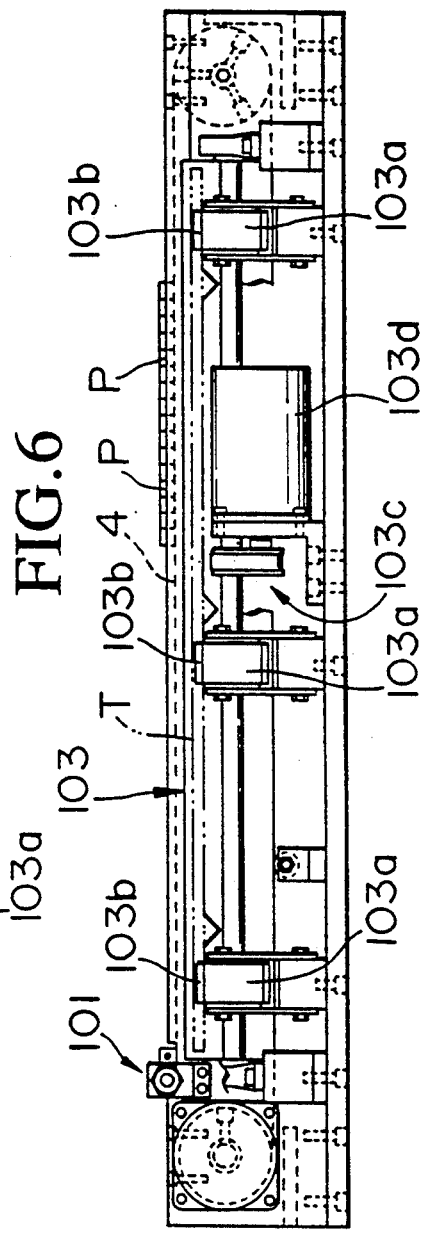

APPARATUS FOR ARRANGING SHORT CYLINDRICAL BODIES

BACKGROUND OF THE INVENTION

1. Field of the Invention

The present invention relates to an apparatus for arranging short cylindrical bodies in general, and relates in particular to its application to a drying apparatus capable of changing the direction of transport of a plurality of pellets, and an associated inspection apparatus for inspecting the external surface quality of each pellet.

2. Technical Background of the Invention

In general, the pellets which are charged into nuclear fuel rods are made by pressing a fuel powder, such as uranium dioxide, into cylindrical pellets of a short rod shape, and sintering the pressed pellets. In the process of producing such pellets, surface chips and other surface defects are sometimes produced on the external surfaces of the pellets. It is therefore necessary to inspect the surface quality of the pellets for the presence of surface defects. Conventionally, such inspections have been performed visually on every sintered pellet to eliminate defective pellets so as to assure the reliability of the reactor operation.

However, such a manual inspection method is not only labor-intensive and time-consuming but also places a large mental stresses on the inspectors who carry out such tasks on a daily basis. To alleviate such problems, the present inventors have previously presented an inspection apparatus for inspecting the surface quality of the pellets based on image processing technology (U.S. Pat. No. 5,019,326).

The inspection apparatus is usually associated with a wet grinding device. The pellets subjected to wet grinding are discharged continuously from the wet grinder with the axis of the short rod-shaped pellets aligned in the transport direction. To inspect the surface quality of the pellets efficiently, it is necessary to quickly change the direction of movement of the pellet from its axial direction to its radial direction in the inspection apparatus so that both the end surfaces and the side surface of the short rod-shaped pellets can be inspected.

Also, for pellet handling purposes, the planar end surfaces of the pellets are provided with a pair of depressions (dish sections), which are prone to collecting moisture from the wet grinding operation. The moisture sometimes affects optical recording of the surface images, because of false surface signals from abnormal reflections and refractions caused by droplets of water collecting in the dish sections.

The presence of water thus interferes with the proper optical inspection of the wet ground pellets, and it is necessary that the pellets be dried completely before optical inspection.

SUMMARY OF THE INVENTION

The present invention was made in view of the technological background presented above, and an object is to present an application of an apparatus for arranging short cylindrical bodies to drying of a plurality of pellets, in which the apparatus also serves as a device for changing the direction of transport of each pellet from an axial direction to a radial direction, so as to facilitate surface inspection of each pellet. The apparatus further includes a device for efficiently transferring the accepted pellets from surface inspection and arranging on a tray for storage.

To achieve the above object, the present invention presents a drying apparatus comprising: a rotation disc of an approximately circular shape rotatable about a disc axis for redirecting each pellet of the plurality of pellets from an axial direction to a radial upward direction; a plurality of pellet pockets formed on the outer periphery of the rotation disc for housing each pellet of the plurality of pellets with the pellet axis lying in the axial direction; and a plurality of gas circulation devices having a plurality of gas circulation paths communicating with the plurality of pellet pockets.

In the apparatus of such a construction, the pellets which are transported horizontally with the axis lying in the direction of the transport are housed in the pellet pocket formed around the periphery of the rotation disc. Accordingly, the direction of transport of the pellets can be changed quickly to a radial upward direction. At the same time, the gas circulation device circulates air flow around each pellet housed in the pellet pocket, thereby drying the pellets completely and efficiently, and promoting efficient inspection of the surfaces of the pellets.

The apparatus further comprises: a pellet displacement monitor which determines changes in the position of the end surface of a pellet being transported in an axial direction; and a pellet transport control device for placing the pellet in a pellet direction change position so as to be housed in a pellet pocket of the rotation disc.

Therefore, the speed of transporting the pellets is determined on the basis of the position of the end surface of a pellet being transported in the axial direction. The pellet is stopped at the pellet direction change position of the rotation disc. The direction of the transport of the pellet is thus efficiently changed from the axial direction to the radial upward direction.

The apparatus is further provided with a control device for rotating the rotation disc through a specific angle when the pellet displacement monitor determines that the pellet has been placed in the pellet direction change position.

Accordingly, when the pellet displacement monitor determines that the pellet has been placed in the pellet direction change position, the control device rotates the rotation disc through a specific angle so as to correctly house the pellet in the pellet pocket of the rotation device, and thereby changing the direction of transport of the pellet for further processing.

The apparatus is further provided with a pellet position sensor which determines that a pellet to be housed in the pellet pocket of the rotation disc has been disposed in the pellet direction change position; and a control device for rotating the rotation disc through a specific angle when the pellet position sensor determines that the pellet has been placed in the pellet direction change position.

Accordingly, it is doubly confirmed that the pellet which has been transported with the pellet axis lying in the axial direction has been placed in the pellet direction change position, thereby assuring that the position change step is performed efficiently without any potential error.

The apparatus is further provided with equidistantly disposed pellet pockets on the circumferential periphery of the rotation disc.

Accordingly, it is possible to transport a plurality of pellets in the radial upward direction at the specific timing.

The apparatus is further provided with a plurality of ratchet devices between two neighboring pellet pockets equidistantly around the circumferential periphery with sharp teeth of the ratchet devices facing in the forward rotational direction of the rotation disc.

Accordingly, the pellet stopped at the pellet direction change position is positively housed in a pellet pocket of the rotation disc.

The apparatus is further provided with a plurality of gas circulation paths comprising a plurality of gas in-ports which direct a gas flow to end surfaces of the plurality of pellets.

Accordingly, both end surfaces of the pellets which are difficult to dry completely can be dried efficiently by the directed air flow.

The apparatus is further provided with a plurality of gas circulation paths comprise a plurality of gas out-ports so as to enable gas to sweep over the end surfaces of pellets.

Accordingly, moisture collecting in the end surface of the pellets and particulate matters in the pellet pockets are exhausted and expelled out the rotation disc, thereby providing efficient drying of the pellets.

The apparatus is constructed such that a plurality of gas in-ports are provided which direct a gas flow to end surfaces of pellets; and a plurality of gas out-ports which exhaust gas from opposing end surfaces of the plurality of pellets; wherein the gas in-ports and the gas out-ports are disposed on both end covers of the rotation disc in the radial direction of the rotation disc, and perform intaking and exhausting of gas so as to alternatingly direct the gas flow to both end surfaces of the plurality of pellets.

Accordingly, the pellets which are being transported through a specific angle are moved from the left end cover to the right end cover alternatingly and subjected to the air flow so as to expose both end surfaces of the pellets to the air flow, thereby promoting to dry both end surfaces positively and efficiently.

The apparatus is further provided with a gas passage groove having a length longer than a diameter of the end surface of the pellets.

Accordingly, the pellet attaching to the end covers do not present barrier to removal of particular matters, thereby promoting the removal of moisture as well as particulate matters.

The apparatus is further provided with a plurality of outflow ports which direct air flow against the side surfaces of the plurality of pellets housed in the pellet pockets.

Accordingly, the air flow is directed to the side surfaces of the pellets, thereby promoting to dry the side surfaces of the pellets efficiently.

In the apparatus of the present construction, the outflow ports are aimed at a bottom region of the pellets housed in the pellet housing pockets.

The pellet in the pellet pocket is thus floated in the air flow, thereby facilitating the sideways movement of the pellets as well a the drying of the underside of the pellets.

The apparatus for arranging short cylindrical bodies (represented by pellets), each pellet having two end surfaces and a side surface and moving from upstream process to downstream process, comprises: a pellet drying section comprising a rotation disc of an approximately circular shape rotatable about a disc axis for redirecting each of a plurality of pellets being transported from an axial direction to a radial upward direction; a plurality of pellet pockets formed on the outer periphery of the rotation disc for housing each pellet of the plurality of pellets in each of the plurality of pellet pockets; and a plurality of gas circulation devices having a plurality of gas circulation paths communicating with the plurality of pellet pockets; a pellet inspection section for recording surface conditions of the two end surfaces and the side surface of each of the plurality of pellets which have been dried in the pellet drying section and have been redirected from an axial direction to a radial upward direction, and for determining acceptance or rejection of each of the plurality of pellets based on recorded images; and grip transporting devices for transporting a plurality of pellets which have been determined to be acceptable in the pellet inspection section; a visual confirmation section for visually inspecting the external appearance of the plurality of pellets transported by the grip transporting devices; and a tray loading device for inserting a tray fully loaded with a plurality of pellets transported from the visual confirmation section by the grip transporting devices into a tray storage rack.

According to the apparatus for arranging pellets of the above configuration, the pellets are dried as well as the direction of their transport is changed. In the inspection section, the end and side surfaces of the pellets are inspected, and the defective pellets are removed, leaving only the defect-free pellets to be transported further. The accepted pellets are inspected once more visually to confirm that the pellets are completely acceptable. The grip transporting device moves the pellets quickly and swiftly to a tray, and when the tray is fully loaded, it is stored by the tray loading device in a tray storage rack.

Therefore, the pellets are accurately and efficiently changed in the direction of transport from an axial direction to a radial upward direction, and the accepted pellets are transferred to the tray and the loaded tray is simply stored in the tray storage rack.

The pellet inspection section of the apparatus further comprises: an end-surface recording device which transports each of the plurality of pellets at a specific time interval, record end surface conditions of the two end surfaces and determines acceptance or rejection of each of the plurality of pellets; and a side-surface recording device comprising a pellet rotation device having a small diameter roller rotating in the same direction and at the same peripheral speed as a proximally-disposed large diameter roller having pellet discharge pockets, for supplying each pellet of the plurality of pellets between the small diameter roller and the large diameter roller at a specific time interval, recording the side surface condition of the side surface of each pellet of the plurality of pellets, and determines acceptance or rejection of each pellet of the plurality of pellets based on an linearly translated image of the side surface of each pellet.

Accordingly, pellets are transported periodically and the end surface of the pellet is recorded successively for determining acceptance/rejection of the pellets. The pellet is then supplied periodically to a space between the small diameter roller and the large diameter roller which are rotating in the same direction and at the same peripheral speed, thereby rotating the pellet. The side surface of the rotating pellet is recorded from above with a side surface recording device, and the pellet is accepted/rejected on the basis of a linearly translated recording image.

The surfaces of the pellet can thus be inspected efficiently and accurately to perform quality control of the pellets.

The pellet inspection section of the apparatus is further provided with a vacuum suction device disposed between the small diameter roller and the large diameter roller.

Accordingly, the pellet is firmly and stably held in place against the rollers by the suction force, thereby enabling to exhaust particulate matters and perform side surface inspection stably.

The apparatus further comprises a pellet collection device, disposed upstream of the pellet drying section in a plurality of pellet transport routes, for collecting a plurality of pellets being transported horizontally, and a spacer device for separating a plurality of pellets being transported horizontally in close contact with each other.

Accordingly, it is possible to collect pellets being transported in the axial direction before forwarding them to the pellet drying section. The spacer device permits the closely disposed pellets to become spaced apart, thereby enabling to send each pellet separately and periodically to the drying section.

The apparatus is constructed so that the pellet collection device becomes activated when an operational problem arises in a downstream section of the pellet drying section.

Accordingly, if an operational problem should arise in a region upstream to the drying section, the operation of the sections downstream to the drying section is stopped, and the collection operation of the pellets is commenced, thereby stopping the supply of pellets to a downstream section of the apparatus. In the upstream of the pellet drying section, the flow of pellets is not disturbed, and the productivity in the upstream of the pellet drying section is not affected.

BRIEF DESCRIPTION OF THE DRAWINGS

In the following description of the various sections of the apparatus, the front view is a view seen in the axial direction of the pellets, i.e. looking at the end surface of the pellets, and the side view is a view seen at right angles to the pellet axis, i.e., looking at the side surface of the pellets .

FIG. 5 is a schematic top view of a pellet collection device.

FIG. 6 is a schematic front view of the pellet collection device.

PREFERRED EMBODIMENT OF THE INVENTION

A first embodiment will be explained in the following with reference to FIGS. 1 to 22. In the following description, the axial direction is the direction parallel to the axis of the short rod-shaped pellets and the radial direction is the direction at right angles to the axial direction.

Figure 1:
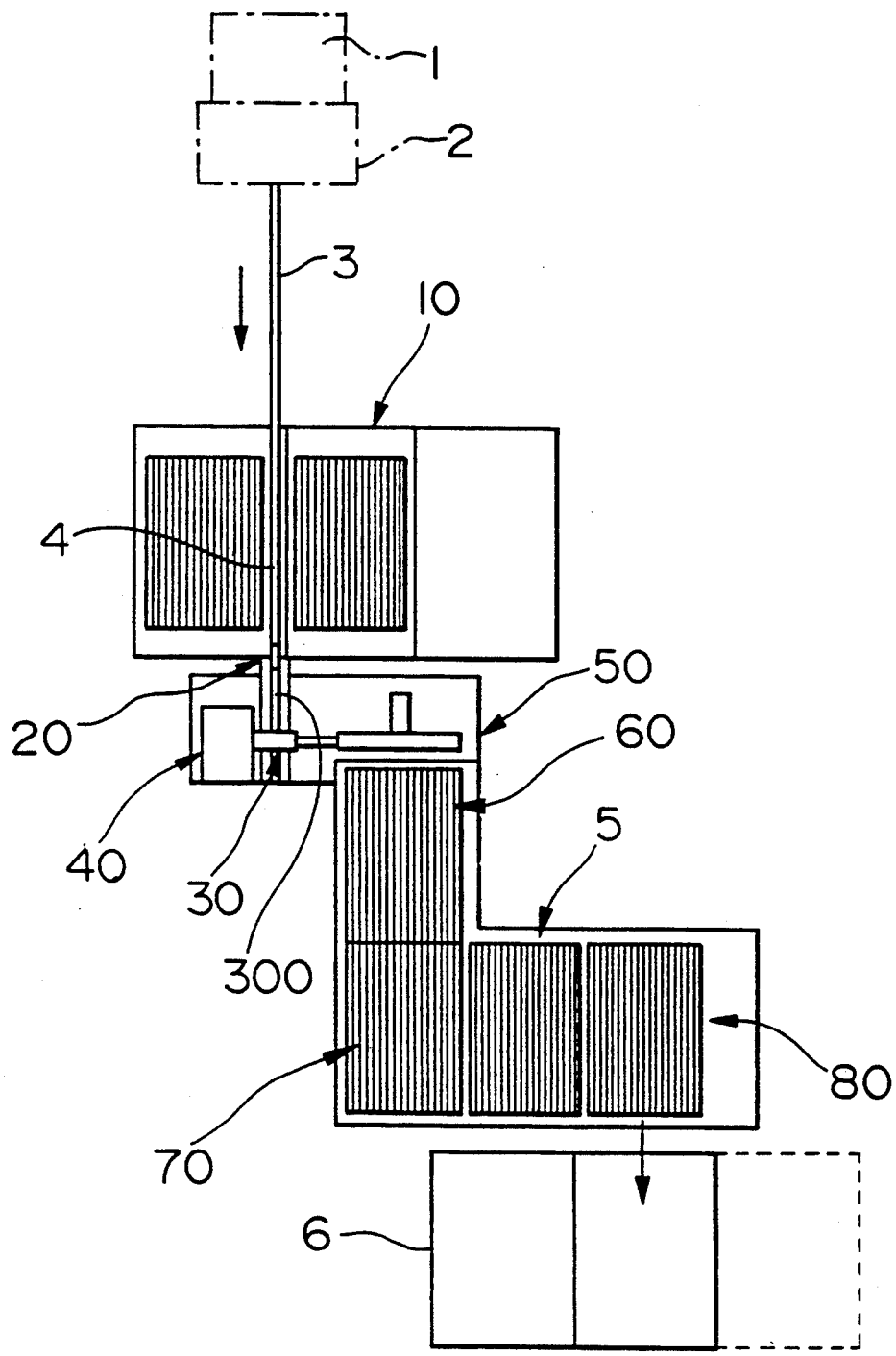
FIG. 1 is a schematic illustration of the overall layout of a first embodiment of the invention.

FIG. 1 illustrates the overall arrangement of the first embodiment, in which the reference numeral 1 refers to a pellet supply section which supplies a plurality of pellets P (in the subsequent description, P is omitted). The pellet supply section 1 is connected to a wet grinding machine 2, and the pellets dimensioned by the wet grinding machine 2 are transported along the transport route 3 with the pellets axis in the axial direction by an endless grinder belt 4 which traverses a pellet collection section 10.

An endless drying belt 300 of a drying section 30 is connected to the endless grinder belt 4 via a transfer section 20. The drying section 30 not only dries the pellets but also changes the direction of movement of the pellets so that pellets are now transported in the radial direction. The dried and re-directed pellets are forwarded to a pellet inspection section 40.

The pellets inspected by the pellet inspection section 40 are forwarded to the visual confirmation section 70 by a pellet transport device 50 via pellet posting section 60 for visual confirmation of the surface condition of the pellets. Then, the pellets are arranged on pellet trays T in the tray posting section 5, and the trays T fully loaded with the pellets are stored in the tray storage racks 6 by the tray loading device 80.

Figure 2:
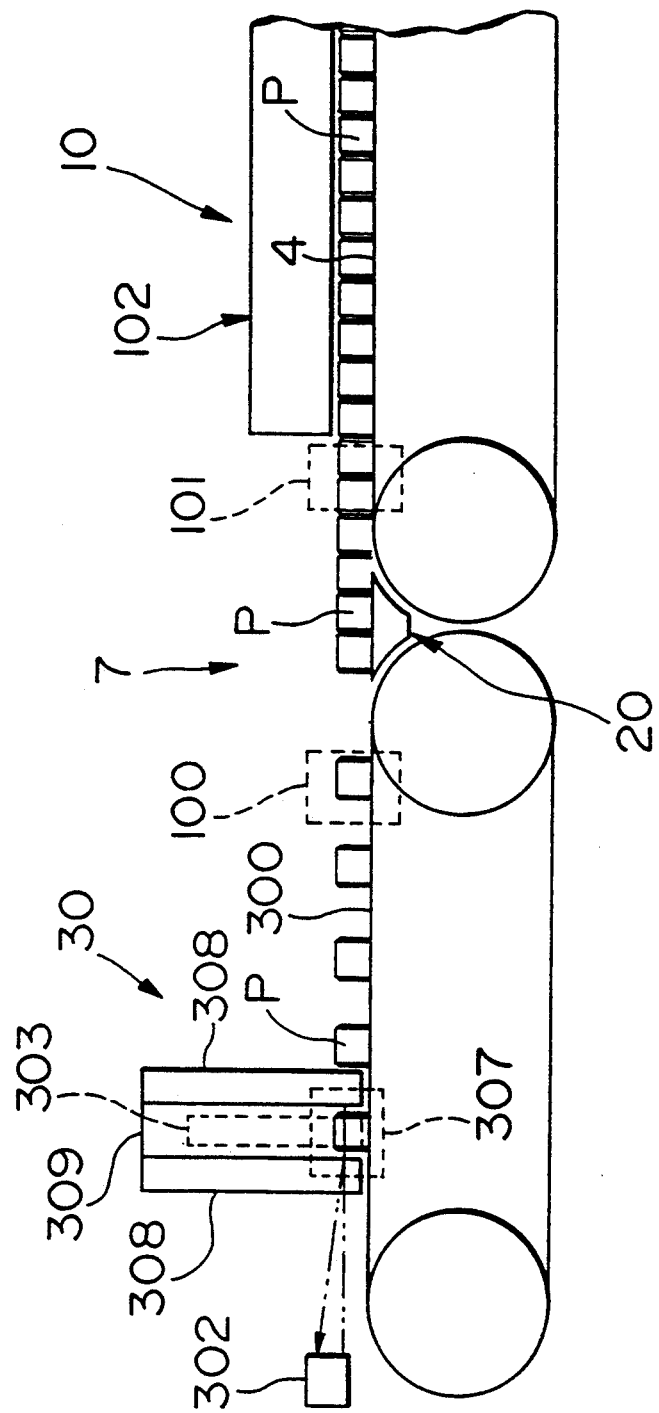
FIG. 2 is a schematic front view of the pellets which are being transported by a grinder belt to a drying section.

As shown in FIG. 2, the pellet collection section 10 is provided with a first pellet stopper 100 which can freely approach or move away from the pellet entering-end of the endless drying belt 300. The pellet collection section 10 is also provided with a second pellet stopper 101 which can freely approach or move away from the pellet discharging-end of the endless grinder belt 4. The pellets on the grinder belt 4 are transported as a group to the pellet collection device 103 by the pellet pick-up device 102. A pellet collection device 103 is disposed below the transport route 3 (refer to FIGS. 5 and 6).

Figure 3:
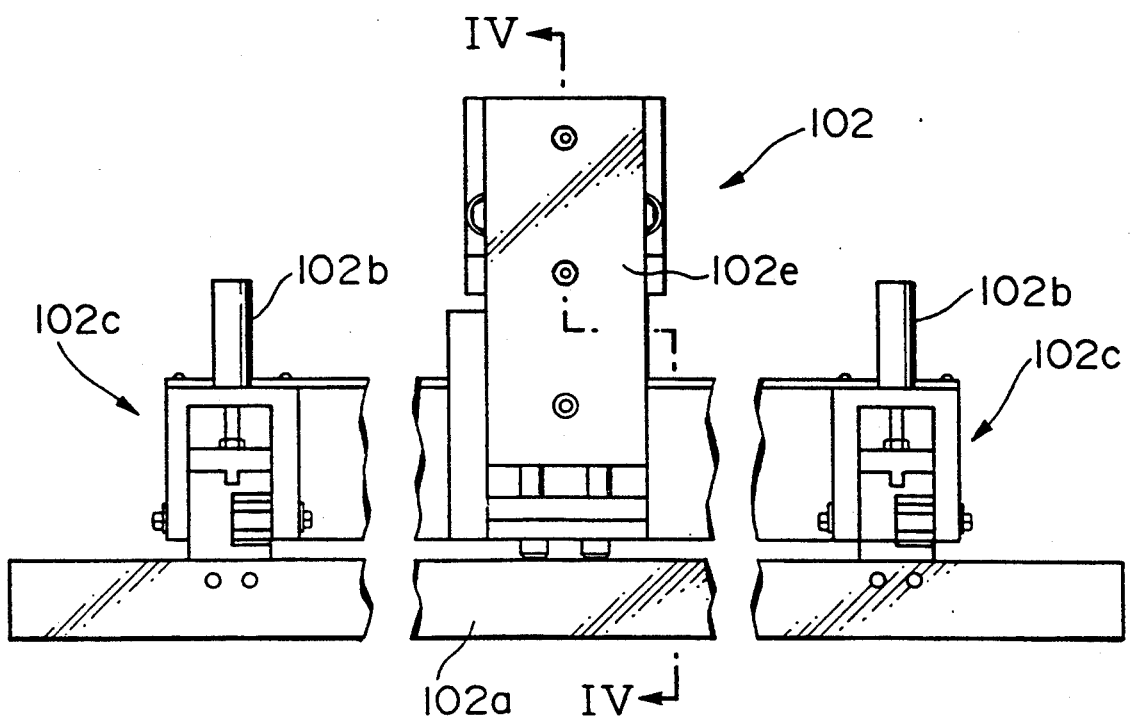
FIG. 3 is a schematic front view of the pellet pick-up device.
Figure 4:
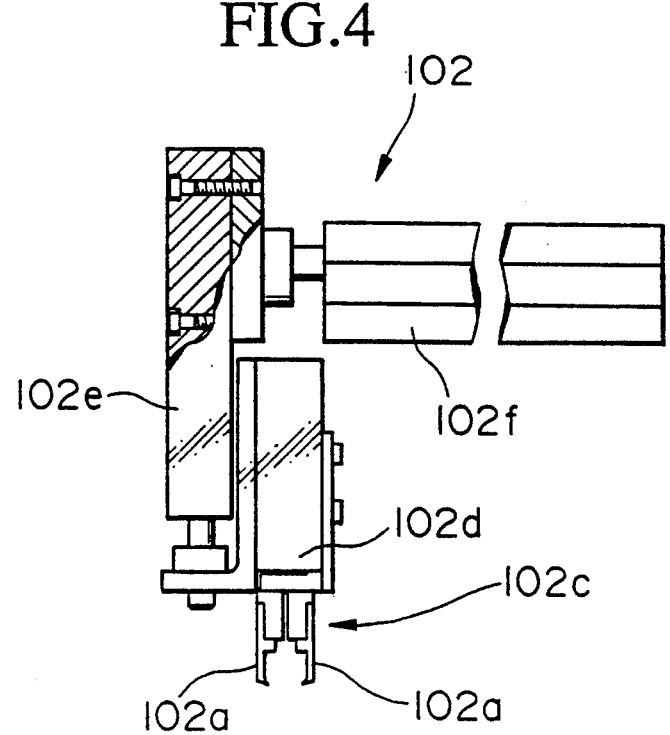
FIG. 4 is a schematic cross sectional view taken at a plane IV—IV in FIG. 3.

The pellet pick-up device 102 comprises, as shown in FIGS. 3 and 4: an opposing pair of plate-shaped pick-up fingers 102a; a pair of closer/opener devices 102c provided with a spring and a pressure cylinder 102b to operate the pick-up fingers 102a; a pair of elevator cylinders 102d, 102e which freely elevatably support the closer/opener devices 102c; and a horizontal pressure cylinder 102f which support the elevator cylinders 102e horizontally.

The pellet collection device 103 comprises, as shown in FIGS. 5 and 6, a plurality of pulleys 103a driving three endless transport belt 103b to move one tray T. The three trays T are connected to and driven by one tray driving motor 103d via a transmission section 103c.

Figure 7:
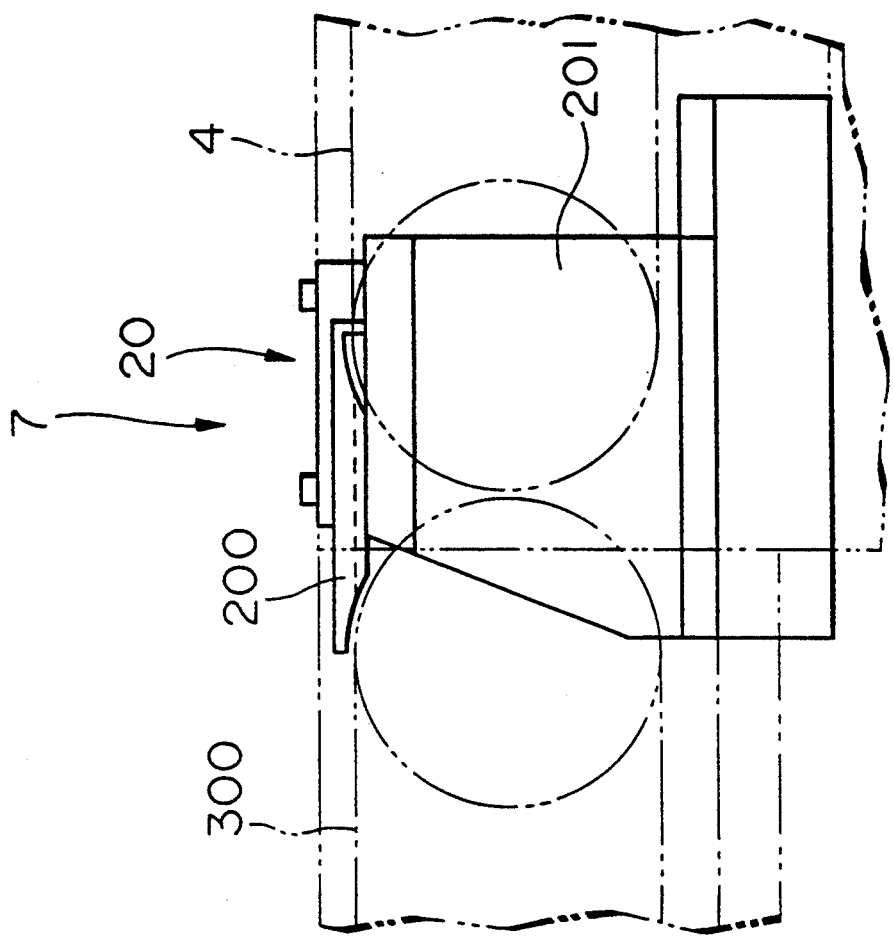
FIG. 7 is a schematic front view of a transfer section.
Figure 8:
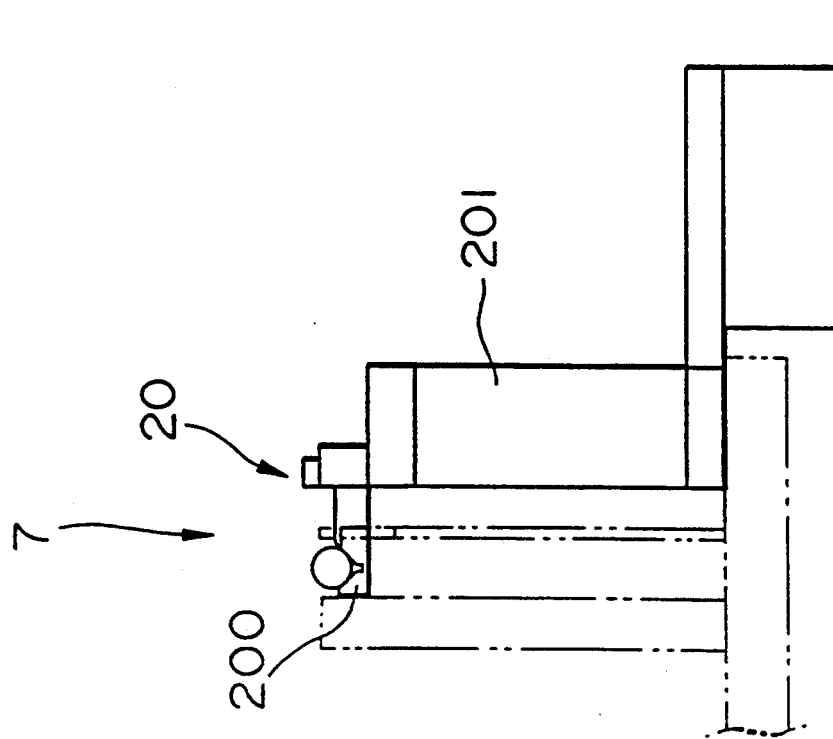
FIG. 8 is a schematic side view of the transfer section shown in FIG. 7.

The transfer section 20 comprises, as shown in FIGS. 7 and 8, a guide member 200 having a V-groove disposed between the grinder belt 4 and the drying belt 300; and a linear feeder 201 which transports the pellets, guided along the V-groove, in the axial direction.

The travelling speed of the drying belt 300 is set higher than that of the grinder belt 4. Therefore, the pellets which are in contact with each other on the grinder belt 4 become separated when transferred on the drying belt 300 by the action of a spacer device 7 shown in FIG. 2, and shown in more detail in FIGS. 7 and 8. On both sides of the grinder belt 4 and the drying belt 300, there are disposed V-groove guides, as in the above mentioned V-grooves for the guide member 200, to prevent the pellets from shifting sideways.

Next, the configuration of the pellet drying section will be explained.

Figure 9:
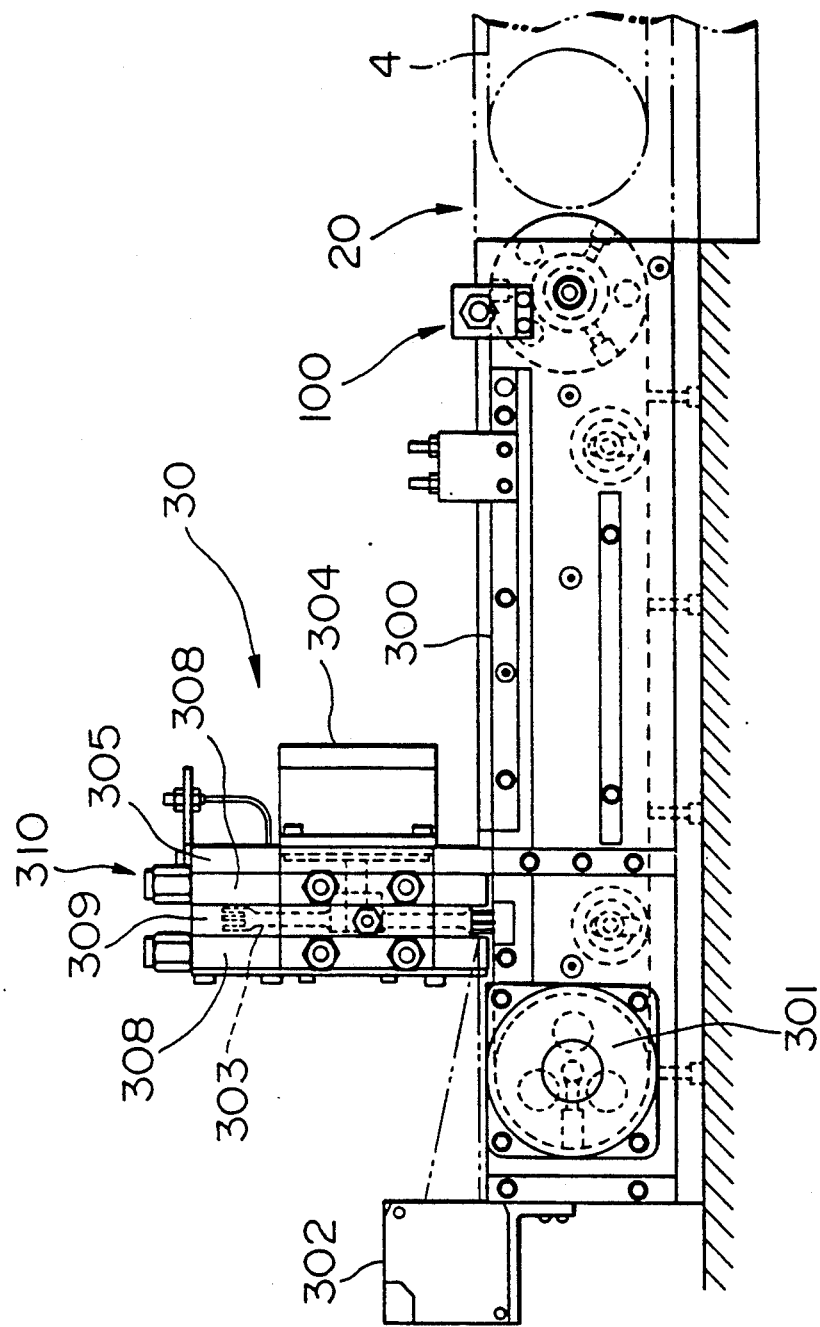
FIG. 9 is a schematic front view of a transport belt section of a pellet drying section.
Figure 10:
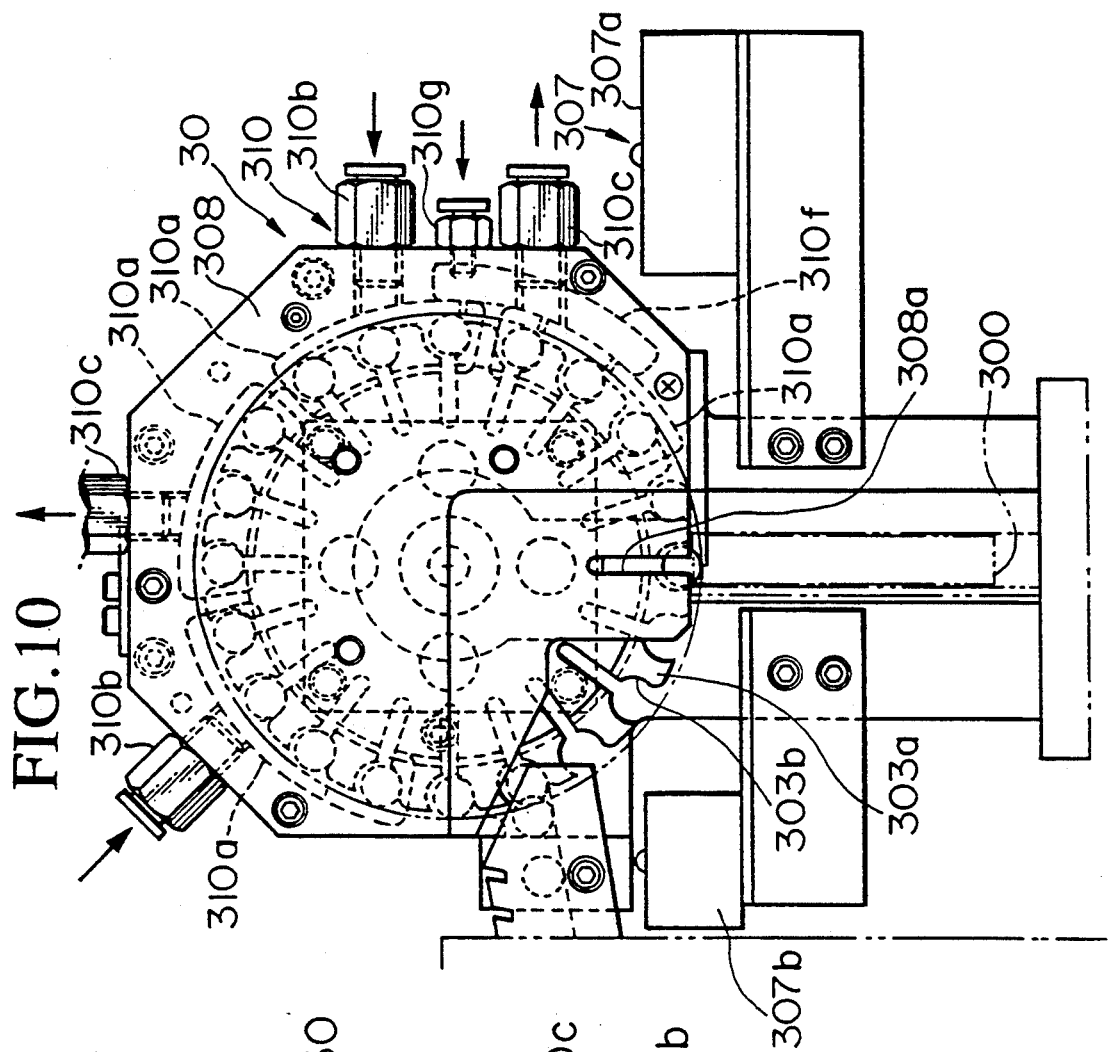
FIG. 10 is a schematic side view of the pellet drying section.

As shown in FIG. 9, the drying belt 300 in the drying section 30 is driven by an ultrasonic motor 301. On the extension of the drying belt 300, there is disposed a laser-operated pellet displacement monitor 302 which determines the position of a pellet being transported on the drying belt 300, by the reflection of a laser beam reflected from the planar end surface of the pellet. Above the drying belt, there is disposed a rotation disc 303 which is freely rotatable about a disc axis parallel to the direction of movement of the drying belt 300.

The rotation disc 303 is connected to a pulse driven motor 304, via an attachment plate 305, which drives the rotation disc 303 in steps. At the intersection point (pellet direction change position) of the drying belt 300 and the rotation disc 303, there is disposed a transmission type pellet position sensor 307 consisting essentially of a laser beam transmitter 307a and a laser beam receiver 307b disposed on each side of the drying belt 300 (refer to FIG. 10). The planar end surface of the pellet is detected by the pellet position sensor 307 when a laser beam transmits through a space between the channels disposed in the ratchet teeth 303a of the rotation disc 303.

The side surfaces of the rotation disc 303 are provided with a pair of end covers 308 which surround a middle cover 309 which encloses the outer circumferential surface of the rotation disc 303. All the covers, 308 and 309 are provided with gas circulation device 310.

Figure 11:
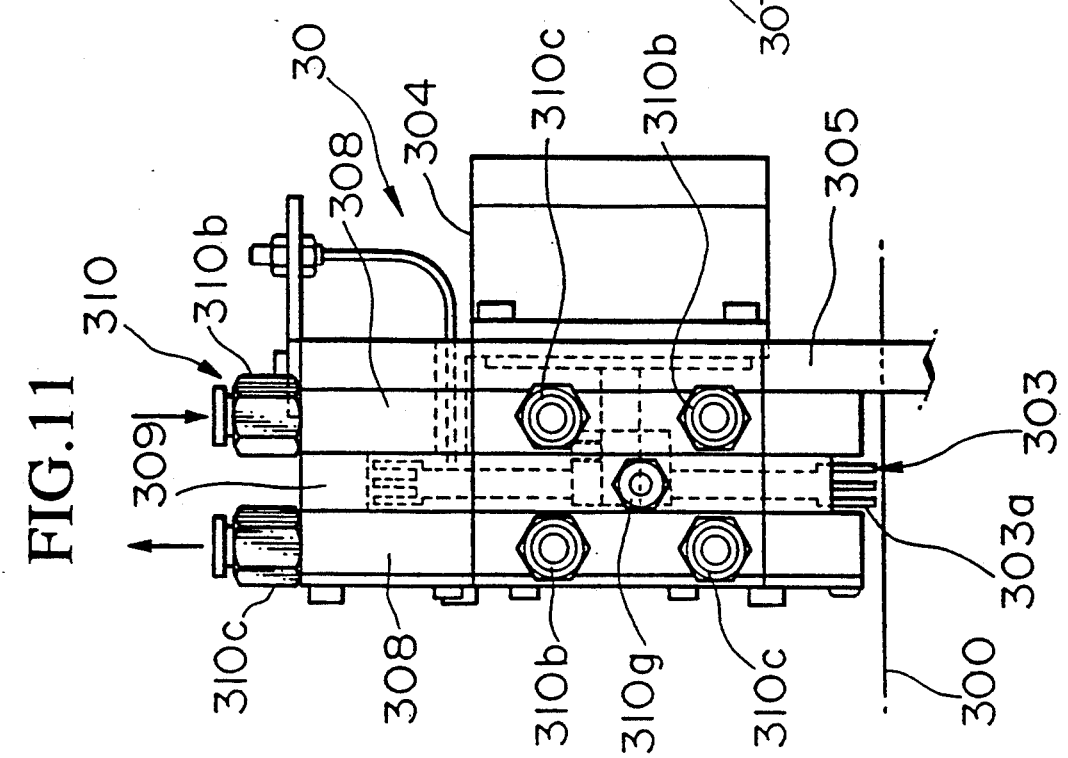
FIG. 11 is a schematic front view of the pellet drying section.
Figure 12:
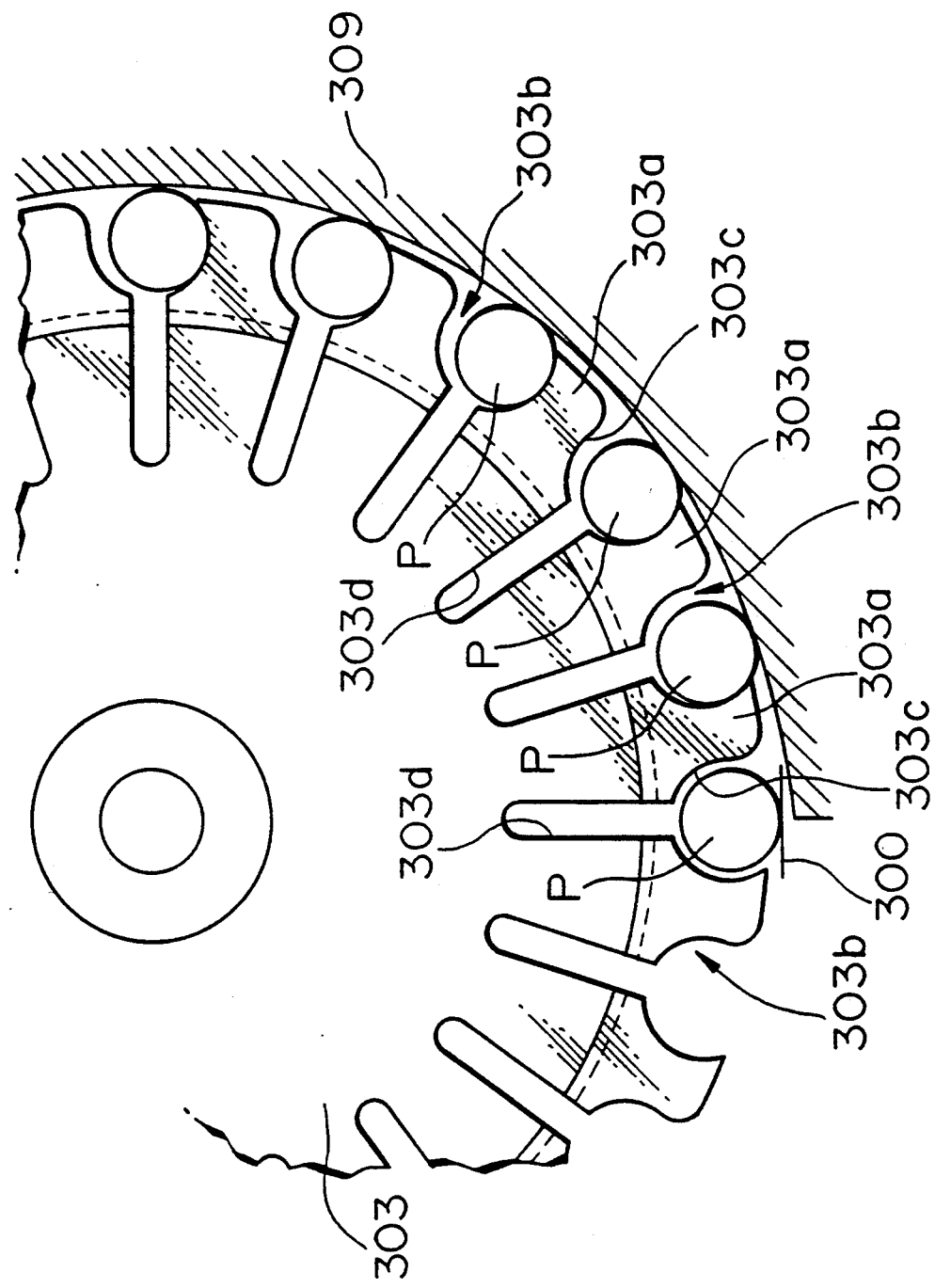
FIG. 12 is a schematic side view of a rotation disc section.

The outer circumferential surface of the rotation disc 303 is provided with ratchet teeth 303a, separated at an equal regular spacing, with the sharp end of the teeth facing the forward rotational direction. Each ratchet teeth 303a is branched into three teeth portions with two grooves interposed in the width direction of the rotation disc 303, as shown in FIG. 11. Viewed in the axial direction of the pellets as shown in FIG. 12, the ratchet teeth 303a are disposed at regular spacing along the circumferential periphery of the rotation disc 303, and the ratchet teeth 303a is formed between two pellet pockets 303b. The pellet pocket 303b consists of a pellet retention space 303c and a radially extending vacant space 303d.

The laser beam from the pellet displacement monitor 302 is radiated onto the planar end surface of the pellet through a rectangular slit 308a (refer to FIGS. 10 and 13), to match the shape of the vacant space 303d, formed on the cover 308 in a location to correspond with the pellet direction change position.

The pellet displacement monitor 302 operates by radiating a laser beam to and measuring the reflected laser beam back from the planar end surface of a pellet approaching the monitor 302 with the pellet axis directed to the monitor 302. The measured distance data are converted into analogue signals, and are inputted into a control device (not shown) which controls the ultrasonic motor 301 for driving the drying belt 300 and the pulse driven motor 304 for driving the rotation disc 303.

The analogue signal inputted into the control device are conditioned, and forwarded to the ultrasonic motor 301 which operates to transport the pellets at an optimum speed.

When the control device confirms that the pellet has reached the direction change position, according to the output signal from the monitor 302 or sensor 307, the control device nullifies the action of the pellet displacement monitor 302 until the completion of the direction change so as to prevent erroneous action of the ultrasonic motor 301 caused by such false signals as the laser beam reflecting from the rotation disc 303 instead of the planar end surface of the pellets. At the same time, the signal from the pellet position sensor 307 is conditioned and applied as a square wave signal to the pulse driven motor 304, thereby moving the rotation disc 303 through a given angle.

When a large surface defect such as a missing piece is present on a pellet, the signal from the monitor 302 or the sensor 307 may be deflected away from the correct path, and may cause problems in activating the pellet direction change. To counter such a situation, the control device receives an ON/OFF signal from the monitor 302 or sensor 307, so that even if one of them becomes unstable, the direction change operation can be performed without hindrance.

Figure 13:
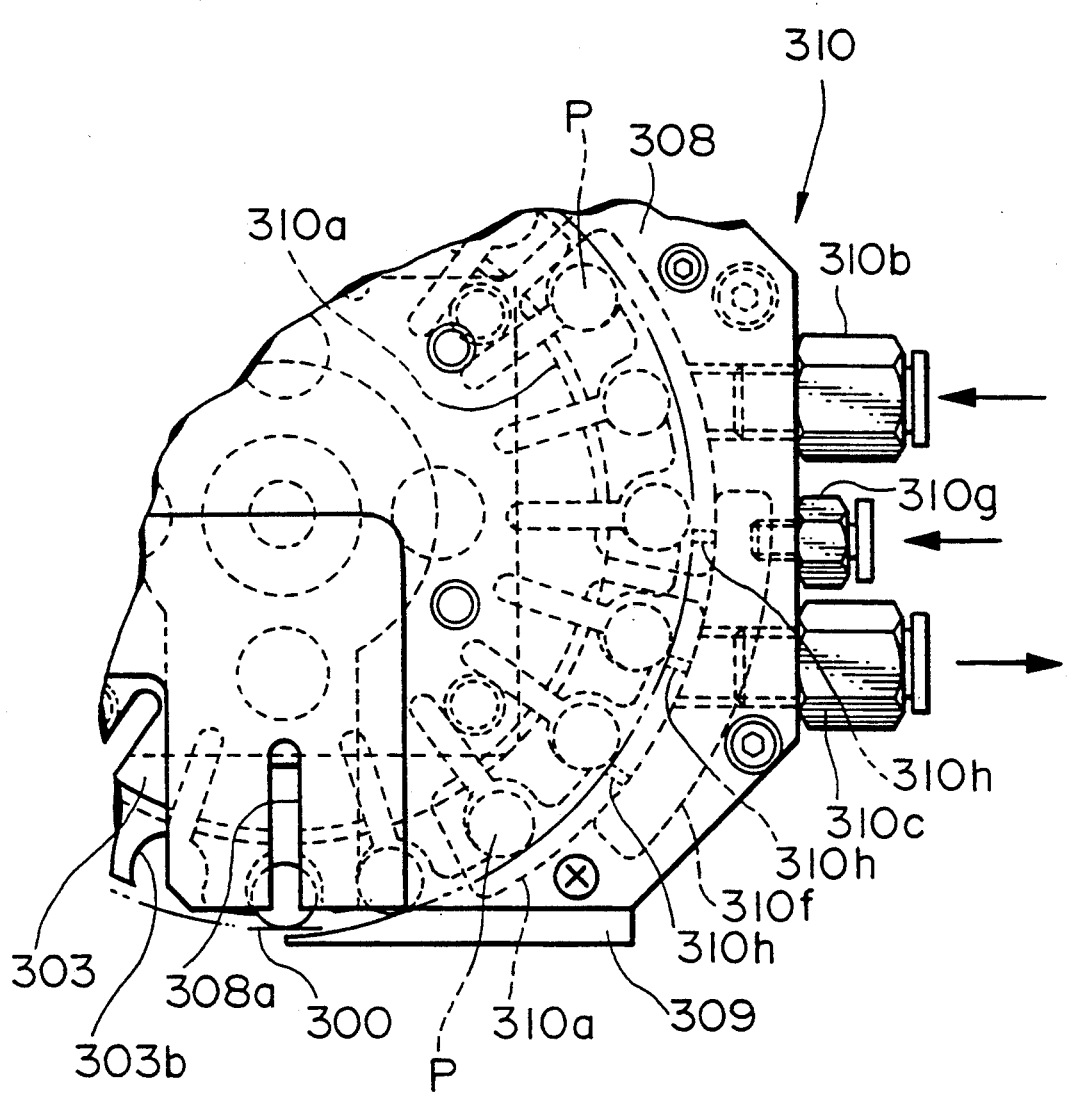
FIG. 13 is a schematic side view of a gas circulation device.
Figure 14:
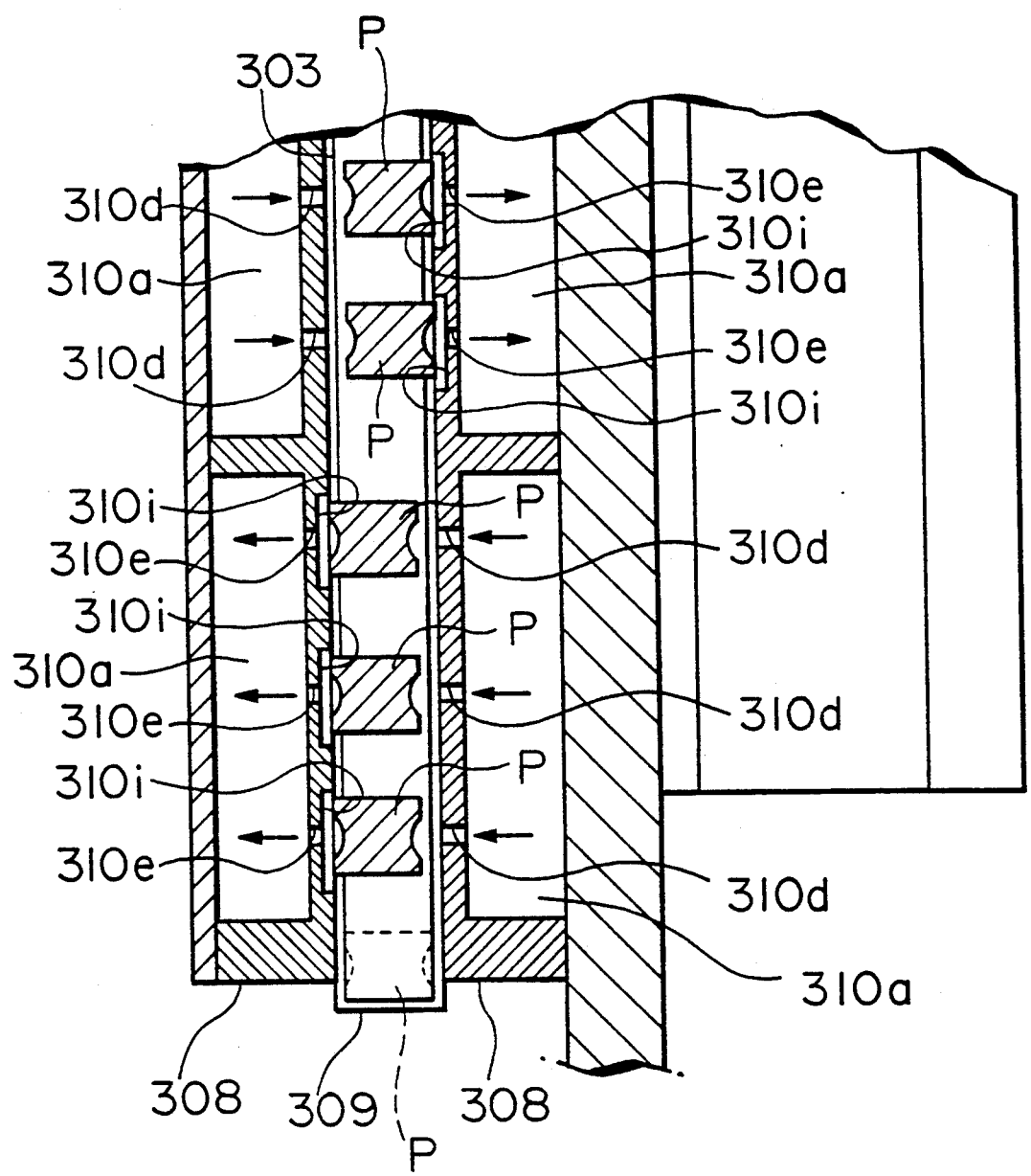
FIG. 14 is a schematic cross sectional view of the relationship between the pellet positions and the gas circulation.

The gas circulation device 310 is shown in FIGS. 13 and 14, and comprises four sets of end-chambers 310a of an arc shape which are formed inside the covers 308 and on opposing sides of the middle cover 309. The covers 308 are provided with air-in connectors 310b and the air-out connectors 310c.

The chambers are constructed such that three in-ports 310d communicating the three neighboring pellet pockets 303b are provided in one end-chamber 310a, and three out-ports 310e communicating the three neighboring pellet pockets 303b are provided in the other end-chamber 310a. The in-ports 310d and the out-ports 310e are disposed opposite to each other.

Inside the middle cover 309, there is formed an arc shaped mid-chamber 310f which receives the air discharged from the air connector 310g. The mid-chamber 310f and the three neighboring pellet pocket 303b are communicated with an outflow port 310h. The air discharged from the outflow port 310h is expelled from the underside of the pellet in the pellet pocket 303b.

The four sets of end-chambers 310a described above are arranged so that the air intake and air exhaust operations are performed alternatingly between the left and right end covers 308. It is preferable that the air used in the dryer operation be dried using a membrane type dryer.

On the walls of the four sets of air chambers 310a having the out-port 310e, there are provided gas passage grooves 310i which extend at right angles to the outport 310e. The width of the grooves 310i is larger than the diameter of the out-port 310e, and its length is longer than the outer diameter of the pellets. Further, the groove is disposed eccentrically with respect to the out-port 310e so that its bottom dimension is larger than the top dimension.

Next, the pellet inspection section 40, illustrated chiefly in FIGS. 15 and 16, will be explained.

The pellet inspection section 40 is arranged such that a pellet discharged from the rotation disc 303 of the pellet drying section 30 is rolled down on a first inclined channel 400, and is charged into and housed in a V-groove 401 of a transport disc 402. The transport disc 402 has a plurality of V-grooves 401 on its outer periphery, and rotates in discrete steps. The end surfaces of the pellets are recorded with a pair of end-surface recording devices 410 which are disposed so as not to interfere visually with each other. The end-surface recording device 410 determines acceptance or rejection of each pellet on the basis of the recorded image.

Figure 15:
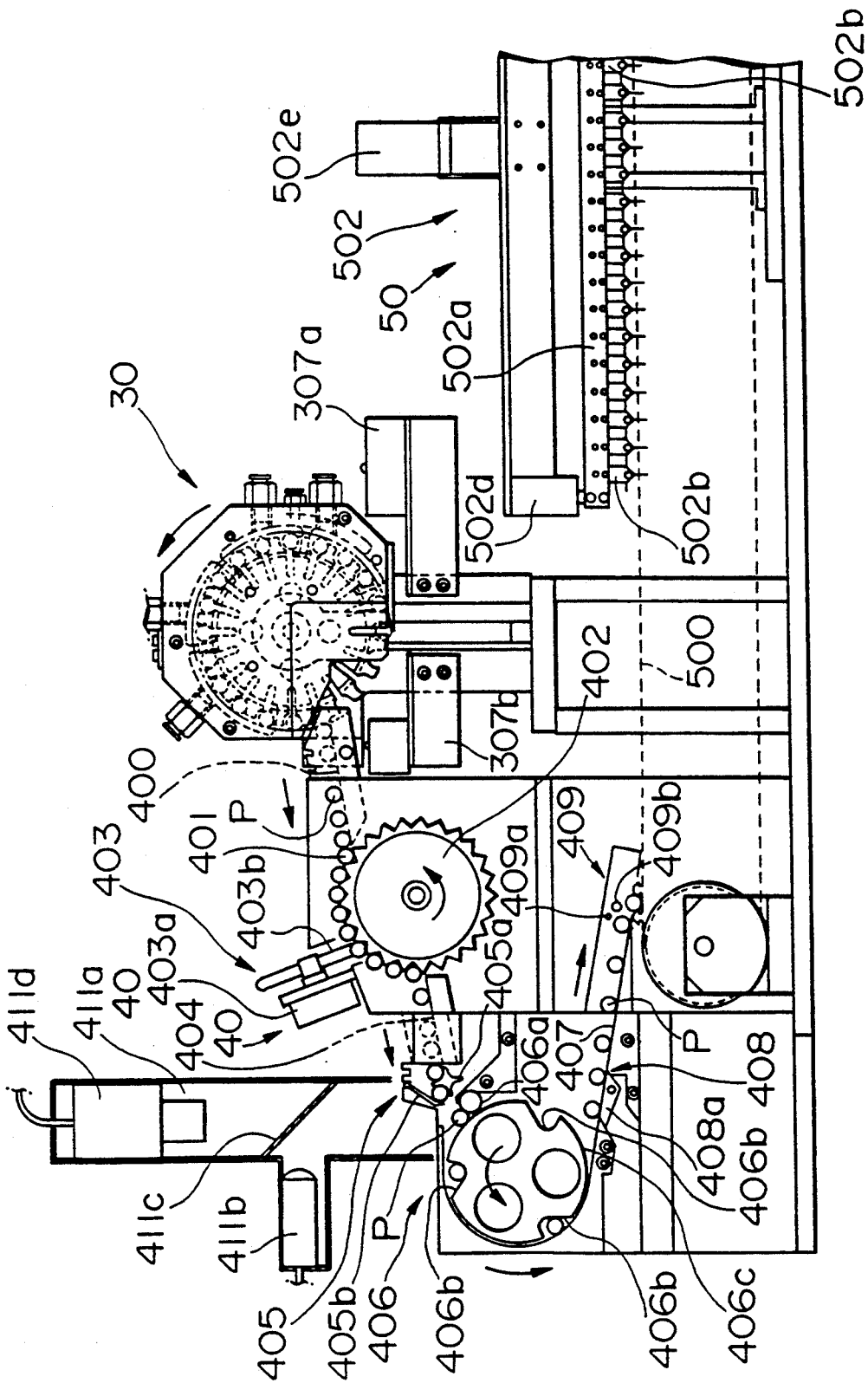
FIG. 15 is a schematic side view illustrating the movement of the pellets from the drying section to the gripping section of the pellet transport device.

FIG. 15 shows the location of a first pellet rejection device 403 which is provided near the transport disc 402 for removing a pellet which has been determined to be a reject by the pair of end-surface recording devices 410 from the transport disc 402.

The accepted pellet from the transport disc 402 rolls down a second inclined channel 404, as shown in FIG. 15, and is supplied periodically to a pellet rotation device 406 via a pellet supply device 405 which rotates stepwise at a specific time interval. The cylindrical side surface of the pellet is examined by the side-surface recording device 411, and the acceptance or rejection of a pellet is determined by the side-surface recording device 411 on the basis of the recorded image.

In the vicinity of the pellet rotation device 406, there is a third inclined channel 407, for rolling down the pellet from the rotation device 406. A second pellet rejection device 408 (refer to FIG. 17) is used for removing the pellet rejected by the side-surface recording device 411 from the third inclined surface 407. The second pellet rejection device 408 operates by activating a discharge member 408a which is disposed, freely movably in the vertical direction, on the third inclined channel 407. At the discharge end of the third inclined channel 407 is disposed a guide device 409 for guiding the pellet to downstream work stations.

The first pellet rejection device 403, shown in FIG. 15, comprises a rotation device 403a disposed above the transport disc 402 and a rejector member 403b disposed on the axis of the rotation device 403a. When the rejector member 403b rotates, the pellet disposed on a V-groove 401 of the transport disc 402 is removed off the V-groove 401 to one side.

Figure 17:
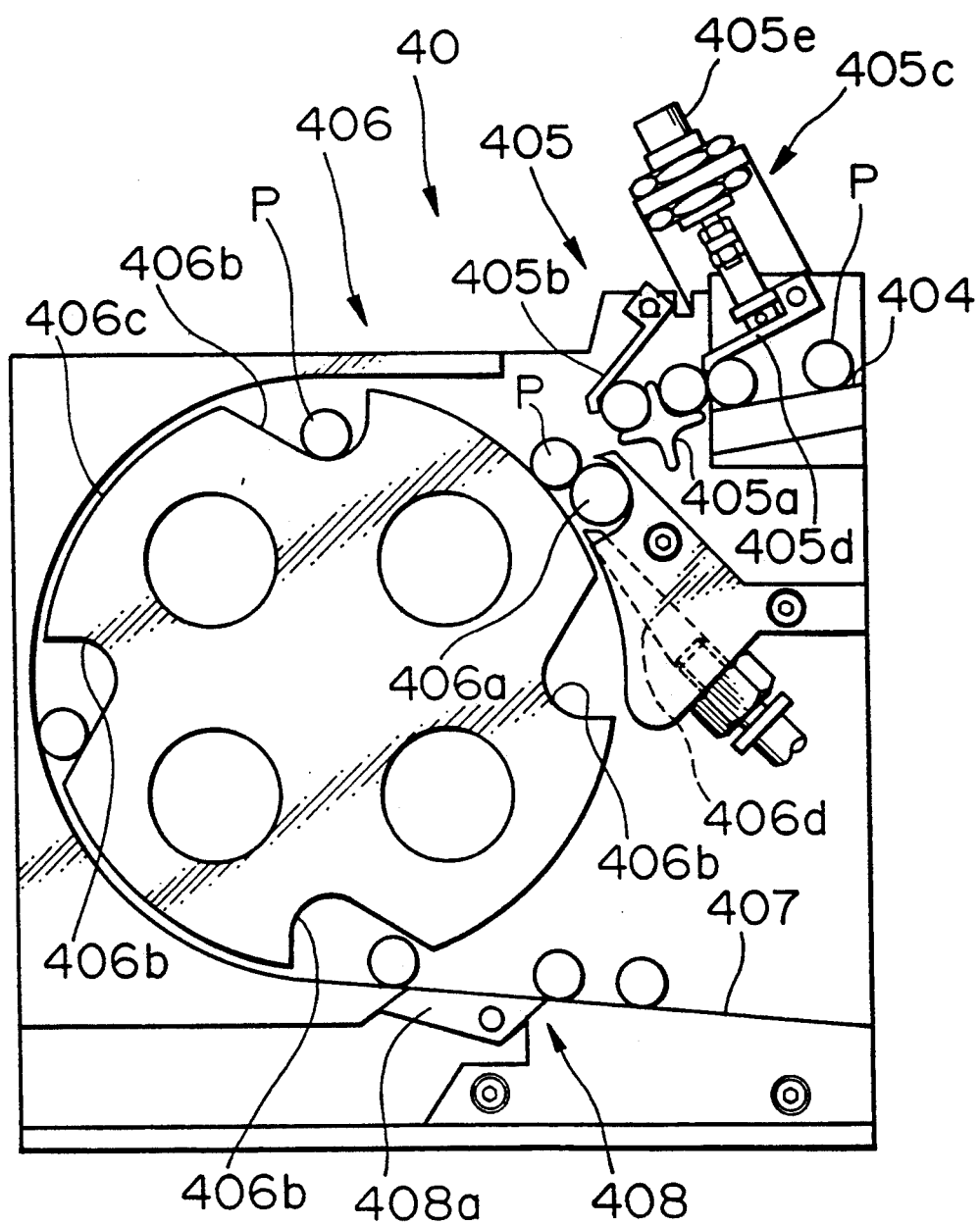
FIG. 17 is a schematic side view of a side surface inspection device provided with four pellet discharge grooves.

The pellet supply device 405 comprises, as shown in FIG. 17, a pellet guiding vane 405a of a cross-shape which is freely rotatable, and a freely pivoting pressing member 405b which presses down on the pellet from above. Opposing the second inclined channel 404, there is a stopper device 405c which clamps the pellet between itself and the second inclined channel 404 when an emergency situation develops. The stopper device 405c is provided with a stopper member 405d, operated by an air cylinder 405e, and is freely movable vertically.

The pellet rotation device 406 comprises a small diameter cylindrical roller 406a, and a large diameter roller 406c, provided with a plurality of hook shaped discharge pocket 406b (three are shown in FIG. 15, and four in FIG. 17), in which both rollers 406a, 406c are rotatable in the counter clockwise direction. In the vicinity and between the rollers 406a, 406c, there is a vacuum suction device 406d which provides a suction force to hold the pellet in place.

The number of the hook shaped discharge pocket 406b of the large diameter roller 406c is chosen in accordance with the inspection speed of the pellets.

Figure 18:
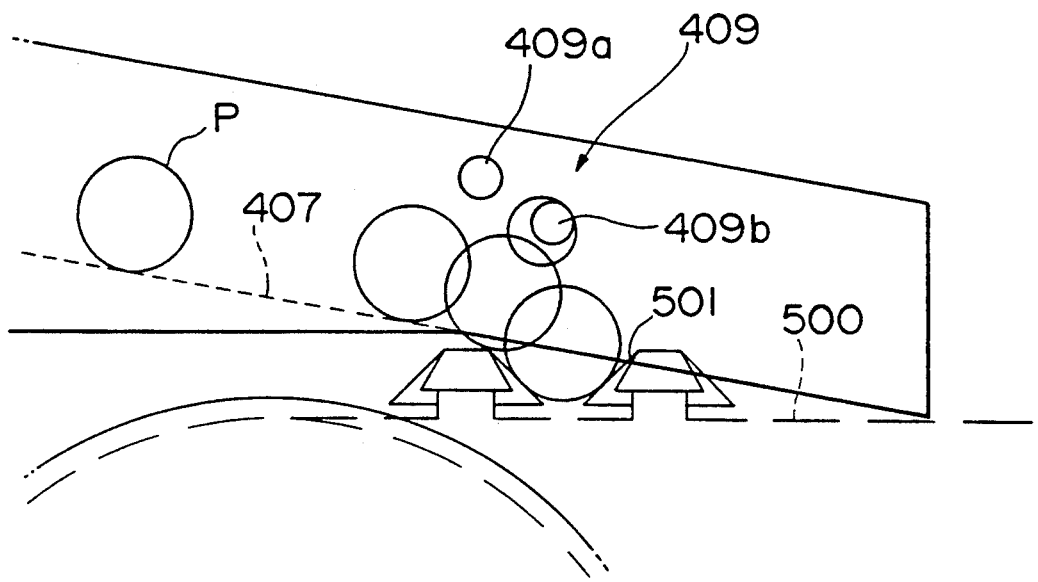
FIG. 18 is a schematic side view of a pellet guiding section.
Figure 19:
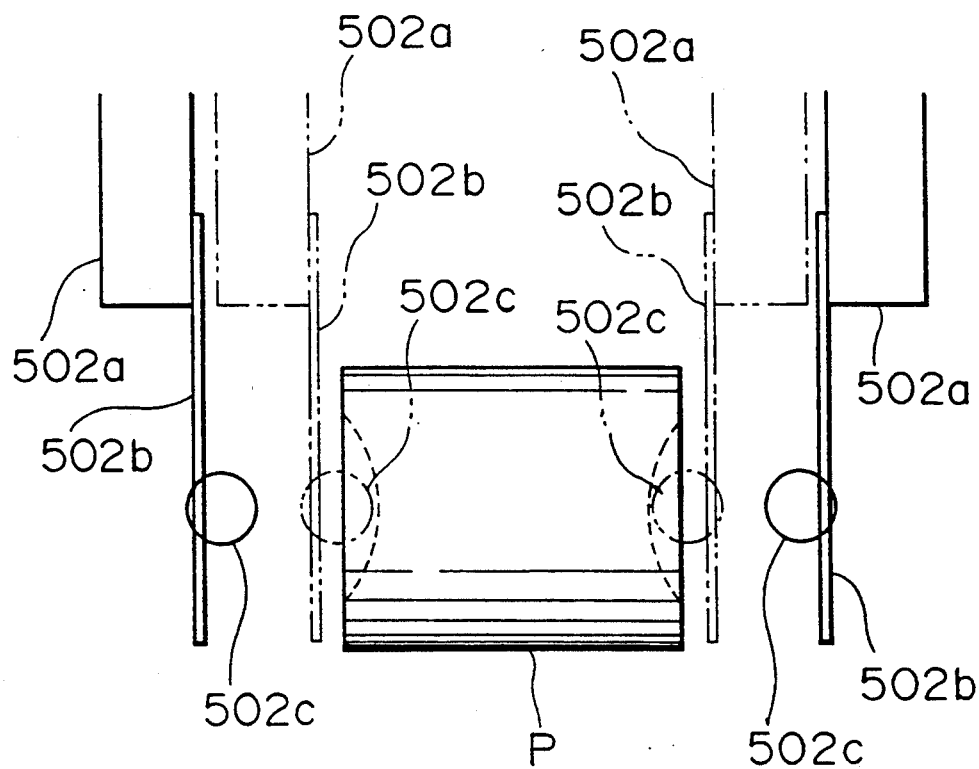
FIG. 19 is a schematic front view showing the tip end of the pellet gripping section.

The guide device 409, as shown in FIG. 18, is provided with a fixed guide pin 409a at the discharge end of the third inclined channel 407 to prevent the pellets from jumping up. A freely idlable guide pin 409b is provided below and to one side of the fixed guide pin 409a to assist in placing the pellet stably on a pellet collection belt 500 of the pellet transport device 50.

Figure 16:
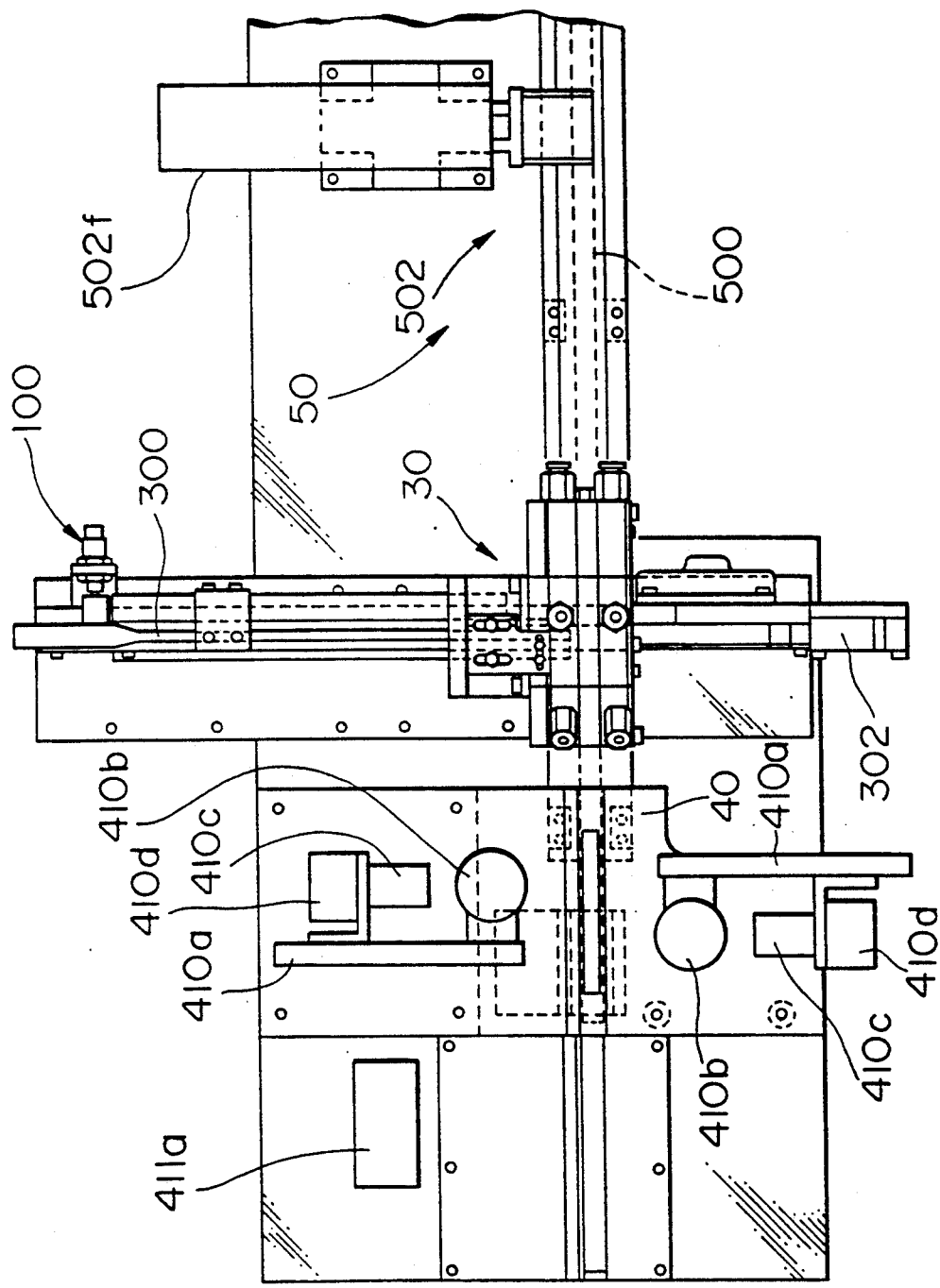
FIG. 16 is a top view of the arrangement shown in FIG. 15.

As shown in FIG. 16, one end-surface recording device 410 is disposed on each side of the transport disc (402), and comprises: a support plate 410a erected on both sides of the transport disc 402; illumination device 410b attached to the support plate 410a for illuminating a planar end surface of a pellet disposed on a V-groove 401; and a CCD camera 410d which records the surface condition of the end surface of the pellet, and determines acceptance or rejection of the pellet in accordance with the recorded image.

The side-surface recording device 411 is disposed above the rollers 406a, 406c, as shown in FIGS. 15, and comprises: an illumination device 411b attached to a support stand 411a; a half-mirror 411c; and a line sensor camera 411d. The illumination can be made either through the half mirror 411c or directly from above. The line sensor camera 411d records the entire side surface of the illuminated and rotating pellet, and produces a linearly translated image of the side surface of the pellet, and determines surface defects from the linearly translated image of the recorded image of the side surface of the pellet.

The pellet transport device 50 comprises: a pellet collection (endless) belt 500 having a plurality of V-grooves 501 for placing a plurality of pellets thereon; a grip transporting device 502 which grips the plurality of pellets placed on the V-grooves 501, and transports the pellets to the pellet posting section 60; and a transport device 503 which transfers the pellets on the pellet posting section 60 to the visual confirmation section 70, and thence to the tray posting section 5.

The grip transporting device 502 comprises: as shown in FIGS. 15, 16 in general and in 19 in detail, a pair of opposing holding plates 502a; a plurality (twenty five for each holding plate 502a in this embodiment) of opposing holding fingers 502b made of a spring type material, attached to the holding plates 502a at an equal spacing in the axial direction; a pair of steel balls 502c attached to the opposing surfaces of the holding fingers 502b; a pair of closer/opener device attached to ends of the holding plates 502a for closing and opening thereof; an elevator device 502e for freely raising or lowering the closer/opener device 502d; and a level support device 502f for freely translating the elevator device 502e in the horizontal direction.

The steel balls 502c engage with the depressions section (dish section) formed on the planar end surfaces of the pellets, thus enabling to grasp the entire twenty five lines of pellets simultaneously, even if there are dimensional differences in the various lines of pellets.

Figure 20:
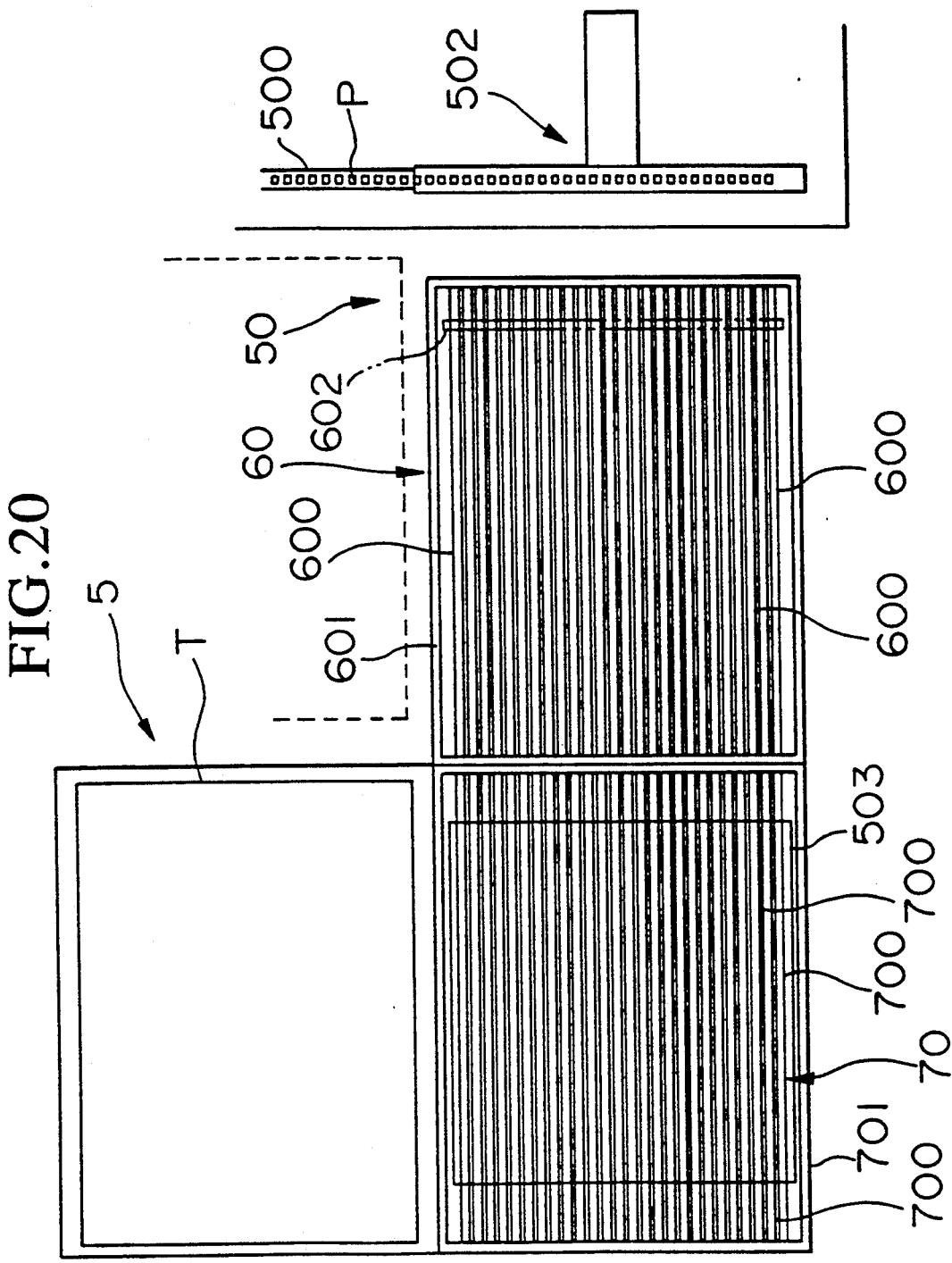
FIG. 20 is a schematic front view illustrating the movement of the pellets from the pellet collection belt to the tray posting section.
Figure 21:
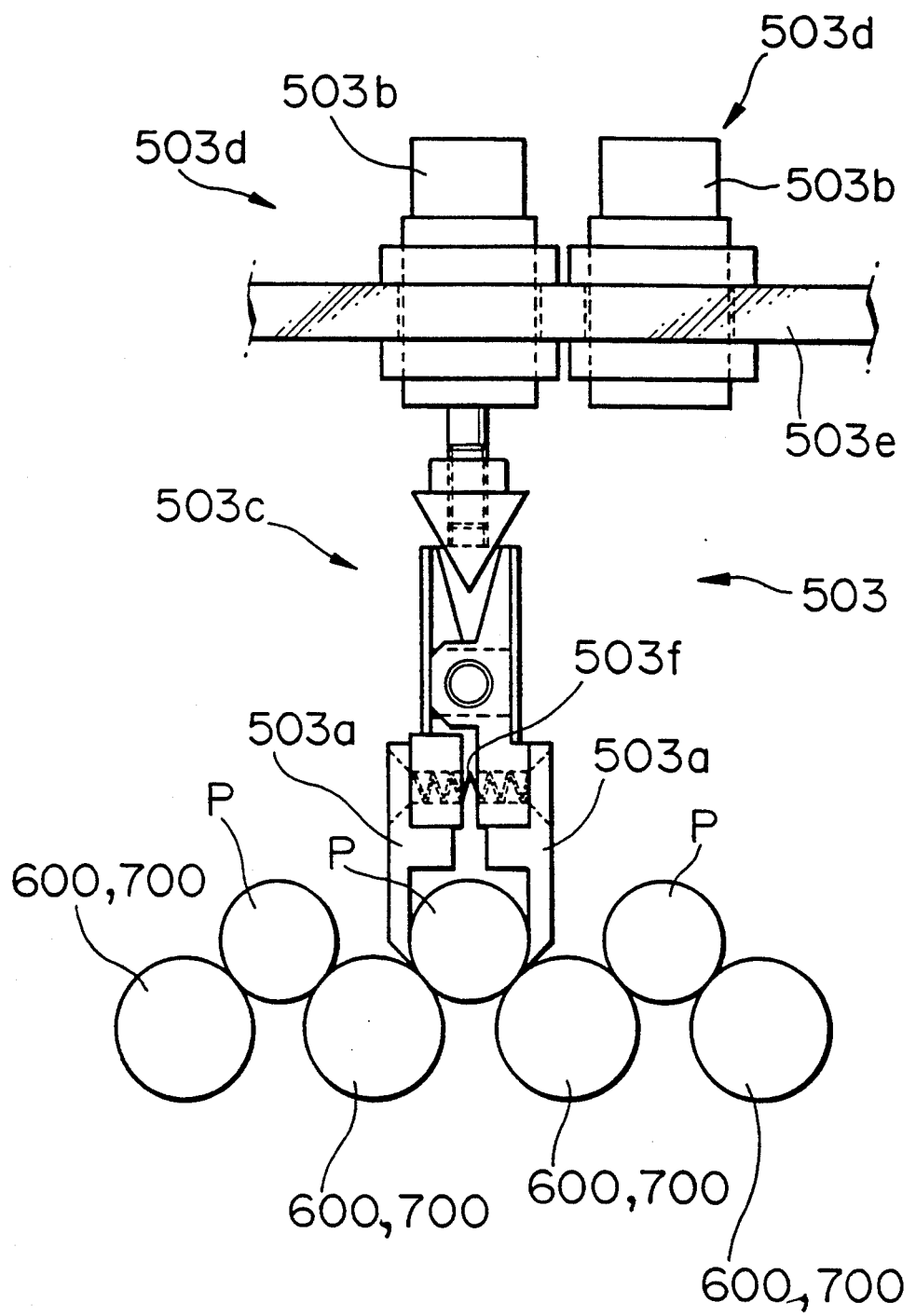
FIG. 21 is a schematic side view of the pellet transport section.

The transport device 503 comprises: as shown in FIG. 21, twenty five sets of gripping units 503d having a closer/opener device 503c comprising a cylinder 503b for closing and opening a pair of opposed gripping claws 503a, and a counter spring 503f; and an attachment section 503e for attaching the gripping units 503d. The attachment section 503e is disposed so as to be freely movable vertically, as well as freely translatable in an L-shape pattern among the pellet posting section 60, visual confirmation section 70 and the tray posting section 5. The arrangement of the above noted sections are illustrated in FIG. 20.

As shown in FIG. 20, the entire pellets disposed on one tray T can thus be transported by the transport section 503.

The pellet posting section 60 comprises: as shown in FIG. 20, twenty six guide axes 600 detachably attached to a guide frame 601; and a pellet aligning plate 602 which pushes the twenty five laterally arranged pellets on the pellet posting section 60 towards the visual inspection section 70, simultaneously, until the pellet posting section 60 becomes fully loaded with twenty fine lines of twenty five laterally arranged pellets. The aligning plate 602 is disposed near the grip transporting device 502, and is able to travel from the entry end to the visual inspection section end.

The visual inspection section 70 is constructed by detachably attaching twenty six revolving axes 700 which are freely rotatable about the axis 700, to a frame 701. The revolving axes 700 are connected to a driving device (not shown) via gears and belt and other associated power transmission members.

Figure 22:
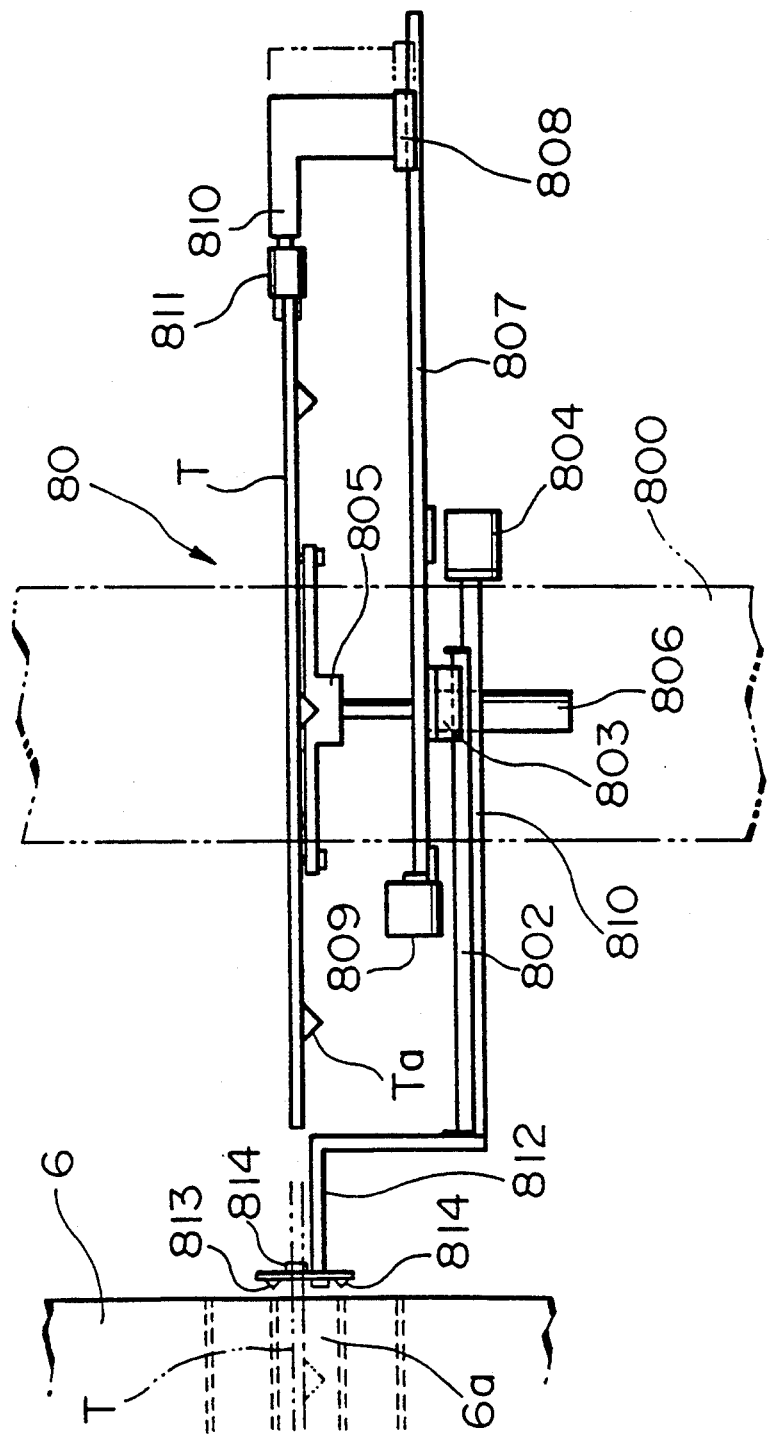
FIG. 22 is an illustration to explain the operation of the tray storage device.

The tray loading device 80 is shown in FIG. 22. The tray loading device 80 comprises: an elevator plate 801 disposed in the elevator section 800 of the tray loading device 80 so as to be freely raised or lowered; a first table 803 disposed on tray rails 802 of the elevator plate 801; and a driving motor 804 which slides the first table 803 horizontally; a tray elevator 805 disposed on the first table 803 so as to be freely raised or lowered; and a tray cylinder 806 which raises or lowers the tray elevator 805.

A second table 808 can be slid horizontally by a tray motor 809 on the tray rails 807 which are disposed roughly parallel to the first table 803. A tray support table 810 is fixed on the second table 808, and at one end of the tray support table 810, there is disposed a tray clamp 811 which can detachably hold the tray T.

On a support member 812 of the elevator plate 801, there is disposed a pair of area sensors 813 which determine the tray storage space 6a and the availability of space for the tray T of the tray storage rack 6. There is also a magnetic sensor 814 disposed on the support member 812 for sensing the leading end of the tray T which passes by the side of the tray T.

The tray T is transported to the initial location in the tray storage racks 6 by a slide plate (not shown) which moves horizontally between the tray loading device 80 and the tray posting section 5.

The above completes the description of the surface inspection facility of the present embodiment.

Next, the steps of handling the pellets will be explained, such as drying a large number of pellets, arranging the pellets on the trays T and storing the trays in the tray storage racks 6 using the surface inspection facility of the present embodiment.

The pellets supplied from the pellet supply section are ground to dimension by the wet grinding machine 2. The pellets are then transported, via transport route 3, with the pellet axis aligned in the axial direction by the (endless) grinder belt 4, which is disposed so as to cross the pellet collection section 10. The pellets are transferred to the drying (endless) belt 300 of the drying section 30 from the grinder endless belt 4 via the transfer section 20.

In this transfer process, even though the wet pellets may be disposed in contact with each other on the grinder belt 4, they become properly separated at a specific separation distance on the drying belt 300, because the speed of the drying belt 300 is set faster than that of the grinder belt 4, and because the guide member 200 of the transfer section 20 is operated by the linear feeder 201 (refer to FIGS. 7 and 8).

The reflective type pellet displacement monitor 302, shown in FIG. 9, detects the leading end face of the leading pellet of the plurality of pellets being transported by the drying belt 300, and the position data is inputted as an analogue signal into a control device (not shown) for controlling the action of the ultrasonic motor 301 and the pulse driven motor 304, respectively, for operating the pellet transport belt drive and the rotation disc drive.

The control device controls the voltage applied to the ultrasonic motor 301 so as to maintain the speed of the drying belt 300 at its optimum. Therefore, when a pellet on the drying belt 300 approaches the intersection (pellet direction change position) between the drying belt 300 and the rotation disc 303, the action of the ultrasonic motor 301 is controlled so as to slow down the drying belt 300 and position the pellet correctly at the pellet direction change position.

In the above control, the upper limit of voltage applied to the ultrasonic motor 301 is limited by the voltage control diode so that the speed of the drying belt 300 is always maintained at a specific speed and never becomes unnecessarily high.

When the pellet reaches the direction change position, the control device temporarily nullifies the operation of the reflective type pellet displacement monitor 302 until the pellet is properly positioned. Therefore, even if reflections occur, for example from the rotation disc 303, there is no danger of erroneous operation of the ultrasonic motor 301.

The control device also controls the voltage of square wave signal applied to the pulse driven motor 304, based on an input signal from the transmission type pellet position sensor 307 to control the rotation disc 303 so as to produce slow start/stop actions through one angular displacement operation (1pitch). Thus, a pellet stopped at the direction change position is correctly picked up by the ratchet teeth 303a and is housed in a pellet pocket 303b.

The control device is able to performs pellet direction change operation according to one ON/OFF signal from either the monitor 302 or the sensor 307 when a pellet having a large surface defect should be transported on the drying belt 300. If one of the devices 302, 307 detects the presence of a defective pellet, even if the other device did not detect the presence, the direction change operation can be performed normally.

As described above, a plurality of pellets are successively brought to the direction change position, housed in the pellet pockets 303b of the rotation disc 303, and are transported upward.

As shown in FIGS. 13 and 14, when a pellet is placed in the pellet pocket 303b, air is supplied to the end chambers 310a disposed in one end cover 308 via the air-in connector 310b, and is directed at one end surface of the pellet via the in-port 310d. In the other end chamber 310a disposed in the other end cover 308, air is exhausted via the air-out connector 310c via out-port 310e, and the other end surface of the pellet in the pellet pocket 303b makes an intimate contact with the wall surface of the end cover 308 having the out-port 310e.

In this embodiment, there is a gas passage grooves 310i are provided for each out-port 310e. The reason for this is that if air is exhausted only through the out-port 310e, the pellet is sucked tightly to the out-port 310e, and the end surface sticks to the wall surface of the end cover 308, thereby subjecting the depressions (dish section) to a vacuum, and stopping air flow.

In the initial stage of drying, moisture is present in the depressions, and they are not eliminated effectively with a vacuum evaporation effect only. Further, the pellet stuck to the wall surface of the end cover 308 represents a drag load on the rotation disc 303 when it tries to rotate upward, thus preventing a smooth operation of the rotation disc 303.

The width of the gas passage grooves 310i is larger than the diameter of the out-port 310e, and its length is longer than the diameter of the pellet. Further, the groove 310i is disposed eccentrically with respect to the out-port 310e, the air inside the pellet pocket 303b passes preferentially through the bottom region of the groove 310i which is longer than its top region. The result is that the air flow in the pellet pockets 303b is preferentially exhausted through the longer bottom region of the groove 310i and flows out from the out-port 310e.

The arrangement described above enables to efficiently eliminate the moisture which is apt to collect at the bottom region of the depression of the pellet, thereby assuring that the moisture is positively eliminated from the entire pellets. This arrangement also serves to lower the drag load on the rotation disc 303.

The four sets of end chambers 310a formed inside the opposing end covers 308 are disposed so as to alternately perform air-intake and air-exhaust functions. In other words, as illustrated in FIG. 14, the direction of air flow, directed at a group of three pellets being dried within an end chamber 310a, is alternatingly changed from one chamber to another. Every time the rotation disc 303 moves, the pellet is subjected to an air flow directed in the opposite direction so that it moves from a left position in one chamber, in which the pellets stick to the left wall of the end cover 308, to a right position in the next chamber, in which the pellets stick to the right wall of the end cover 308. Therefore, both end surfaces are exposed equally to the air flow which sweeps over the end surfaces, thus promoting efficient drying of both end surfaces of the pellets. By exhausting the air flow coming from the in-port 310d through the out-port 310e, scattering of particulate matters, such as pellet powder, can be prevented.

Also, air is supplied to the air connector 310g provided in the mid-chamber 310f of the middle cover 309 (refer to FIG. 13). The air sweeps over the side surfaces of the pellets and is discharged through the bottom region of the pellets housed in the pellet pockets 303b via the outflow ports 310h. This action of the flowing air lifts and floats the pellet in the pellet pocket 303b, thereby promoting drying of the bottom region of the side surface of the pellet as well as to facilitate the sideways movement of the pellets within the pellet pocket 303b.

Next, the pellet is discharged from the pellet pocket 303b as the rotation disc turns stepwise (refer to FIG. 15) periodically. The pellet rolls down the first inclined channel 400, and is housed in a V-groove of the transport disc 402, from which it is forwarded one at a time to the next operation. When the pellet is stopped for the inspection of the end surfaces, the illumination devices 410b illuminate the end surfaces of the pellet and the CCD cameras 410d record the conditions of the end surfaces. The presence of absence of end surface defects is determined by the end-surface recording device 410, on the basis of the recorded images by the CCD cameras.

If a pellet is determined to have an end surface defect by the end-surface recording device 410, then the reject pellet is removed to one side from the transport disc 402 by the action of the rotating device 403b operated by the rotation device 403a of the first pellet rejection device 403. The accepted pellet discharged from the transport disc 402 rolls down the second inclined channel 404, and is supplied periodically to the pellet rotation device 406 by the action of the guiding vane 405a and the pressing member 405b of the pellet supply device 405. The pellet is disposed between the small diameter roller 406a and the large diameter roller 406c of the pellet rotation device 406, and is rotated by the rollers 406a, 406c (refer to FIG. 17).

The rollers 406a, 406c are rotated in the same direction at the same peripheral speed. The pellet is held in the space between the rollers 406a, 406c by means of the vacuum suction provided by the vacuum suction device 406d. This is to prevent the pellet from jumping up by the force of impact when it is dropped into the space, thereby permitting the pellet to rotate smoothly and stably between the roller 406a, 406c.

The above arrangement enables to record the condition of the side surface of the pellet rotating at a stable high speed, and to prevent scattering of particle matters such as pellet powder by positively eliminating them with the vacuum suction device 406d.

After the side surface has been examined with the side-surface recording device 411, the pellet is housed in the pellet discharge pocket 406b of the large diameter roller 406c, and is discharged into the third inclined channel 407.

If a pellet is determined to be defective by the side-surface recording device 411, the defective pellet is removed by operating the discharge member 408a of the second pellet rejection device 408 downward (refer to FIG. 17). The operation of the discharge member 408a is synchronized with the speed of rotation of the large diameter roller 406c to discharge the reject pellet.

The accepted pellet rolls down to the end of the third inclined channel 407, and is disposed on a V-groove of the collection belt 500 reliably guided by the fixed guide pin 409a and the idlable guide pin 409b of the guiding device 409. The cooperative action of the fixed guide pin 409a and the idlable guide pin 409b positively prevents the occurrence of improper sequencing of the succeeding pellet, caused by such accidents as a succeeding pellet jumping over the preceding pellet, or pellet being bounced by hitting a protrusion on the V-grooves while the accepted pellet is being placed on the V-groove.

As more and more accepted pellets are placed on the V-grooves 501 of the collection belt 500, the pellets gradually move toward the downstream side of the grip transporting device 502 to form a line of pellets. When a certain number of pellets (twenty five in this embodiment) is accumulated, the collection belt 500 is stopped and one line of pellets are placed directly below the holding finger 502b of the grip transporting device 502. By operating the holding plate 502a with the closer/opener device 502d of the grip transporting device 502, a line of pellets are held between the steels balls 502c of one pair of the holding fingers 502b (refer to FIG. 19). As other pellet lines are formed, the same process is repeated to place the pellet line below the steels balls 502c. The line of pellets is lifted by the elevator device 502e, translated by the level support device 502f and are placed between the twenty six guide axes 600 of the pellet posting section 60.

The laterally arranged twenty five pellets are pushed out by the aligning plate 602 toward the visual confirmation section 70. By repeating this process for the next twenty four lines of pellets, lines of pellets is placed successively on the guide axes 600, and a tray T becomes fully loaded with twenty five lines of pellets in the pellet posting section 60.

By operating the twenty five units of gripping unit 503d of the transport device 503, shown in FIG. 21, the entire lot of pellets to be arranged on the tray T are gripped at once, and by operating the attachment member 503e to elevate and translate horizontally, the entire lot of pellets are placed between the twenty six revolving axes 700 of the visual confirmation section 70.

In the visual confirmation section 70, the revolving axes 700 makes the pellets to revolve, and an inspector can examine the pellet surfaces visually to confirm that there are no abnormalities. Upon completion of the visual inspection, the entire lot of pellets on one tray T are placed at once on a tray T in the tray posting section 5.

Next, the tray T is transported horizontally by the slide plate (not shown) from the tray posting facility 5 to the initial position of the tray loading device shown in FIG. 22. When the tray T is stopped above the tray elevator 805 of the tray loading device, the tray elevator 805 is raised by the tray cylinder 806, and is moved away from the slide plate, permitting the slide plate to be returned to its original position. The tray T is clamped by the tray clamp 811 attached to the end of the tray support table 810 (refer to FIG. 22).

The tray T is moved vertically in the tray elevator section 800, and is stopped in front of a potential tray storage space 6a of the pellet storage racks 6. In this condition, the area sensor 813 checks the tray storage space 6a to confirm the location and its availability. Next, the driving motor 804 operates to advance the first table 803 and the leading end of the tray T approaches the magnetic sensor 814, disposed close to the tray storage rack 6, which confirms the position of the leading end of the tray T.

Next, unless the magnetic sensor 814 detects an abnormality, the driving motor 804 is activated to advance the tray T, and insert the leading end of the tray T into the storage space 6a. When the leg section Ta of the tray T is inside the tray storage space 6a, the movement of the first table 803 is stopped, the tray elevator 805 is lowered, and the leading end of the tray T is supported in the tray storage space 6a.

The tray clamp 811 attached to the base end of the tray T is advanced by the tray motor 809 to push the tray T into the tray storage space 6a. When the tray T has been inserted to a specified position, the tray motor 809 is stopped, and the tray clamp 811 is gradually released. At the same time, the second table 808 retracts along with the tray support table 810 and the tray clamp 811.

According to the steps presented above, the tray T is stored in the tray storage space 6a of the tray storage rack 6.

After the completion of the storage process of one tray T, an empty tray T stored in another location of the tray storage spaces 6a of the tray storage rack 6 is pulled out by following the reverse steps to the tray insertion process presented above. The empty tray T is placed on the tray posting section 5, and the process is repeated to place a new lot of pellets thereon.

Next, the process of recovering the pellets when some problems arise in some section after the drying section 30 will be explained.

For example, if a problem arises in the grip transporting device 502, first the pellet inspection section 40 is shut down, followed by the drying section 30. Then, the following steps are carried out to efficiently recover the pellets forwarded from the wet grinding machine 2.

When a pellet recovery command is issued, the first pellet stopper 100, shown in FIG. 2, is activated through the space between the pellets. The first stopper rises above the drying belt 300, and stops the flow of the pellets. The position of the first stopper 100 is set so that the tip of the pellet pick-up device 102 comes between the boundary of closely contacting pellets. This is done to prevent the pellet pick-up device 102 to lift the pellets in some abnormal condition, such as a tilted condition, thereby efficiently lifting many pellets.

In the above condition, the pellets become arranged in close contact on the transfer section 20 and the grinder belt 4, starting from the first stopper 100 and heading towards the backward direction. The pick-up device 102 is thus able to lift many pellets positively.

When a sufficient number of pellets, which can be lifted by the pick-up device 102, are lined up on the grinder belt 4, the grinder belt 4 is stopped. The pellets on the grinder belt 4 are picked up by a pair of pick-up fingers 102a by operating the closer/opener device 102c, and grasping the pellets therebetween. The pellets are lifted and transported onto the grooves of the tray T on the transport belt 103b of the pellet on device 103, by operating the elevator cylinder 102d, 102e and the horizontal pressure cylinder 102f.

In the meantime, the first stopper 100 is retreated from the drying belt 300, and the linear feeder is operated to move the pellets on the transfer section 20 towards the drying belt 300. Next, the grinding belt 4 is activated and the second stopper 101 projects beyond the transport belt 4, which results in a certain number of pellets being lined up on the grinder belt 4. The pick-up device 102 is operated to lift the lined up pellets, and as before, these pellets are transferred onto the tray T on the transport belt 103b of the pellet collection device 103.

The tray T disposed on the transport belt 103b of the pellet collection device 103 is moved one pitch by the tray driving motor 103d so as to position an empty groove in a specified position (pellet placement position for the pick-up device 102). The above described steps are repeated until the problem which arose after the drying section 30 is resolved, and the pellet recovery command is cancelled.

Figure 23:
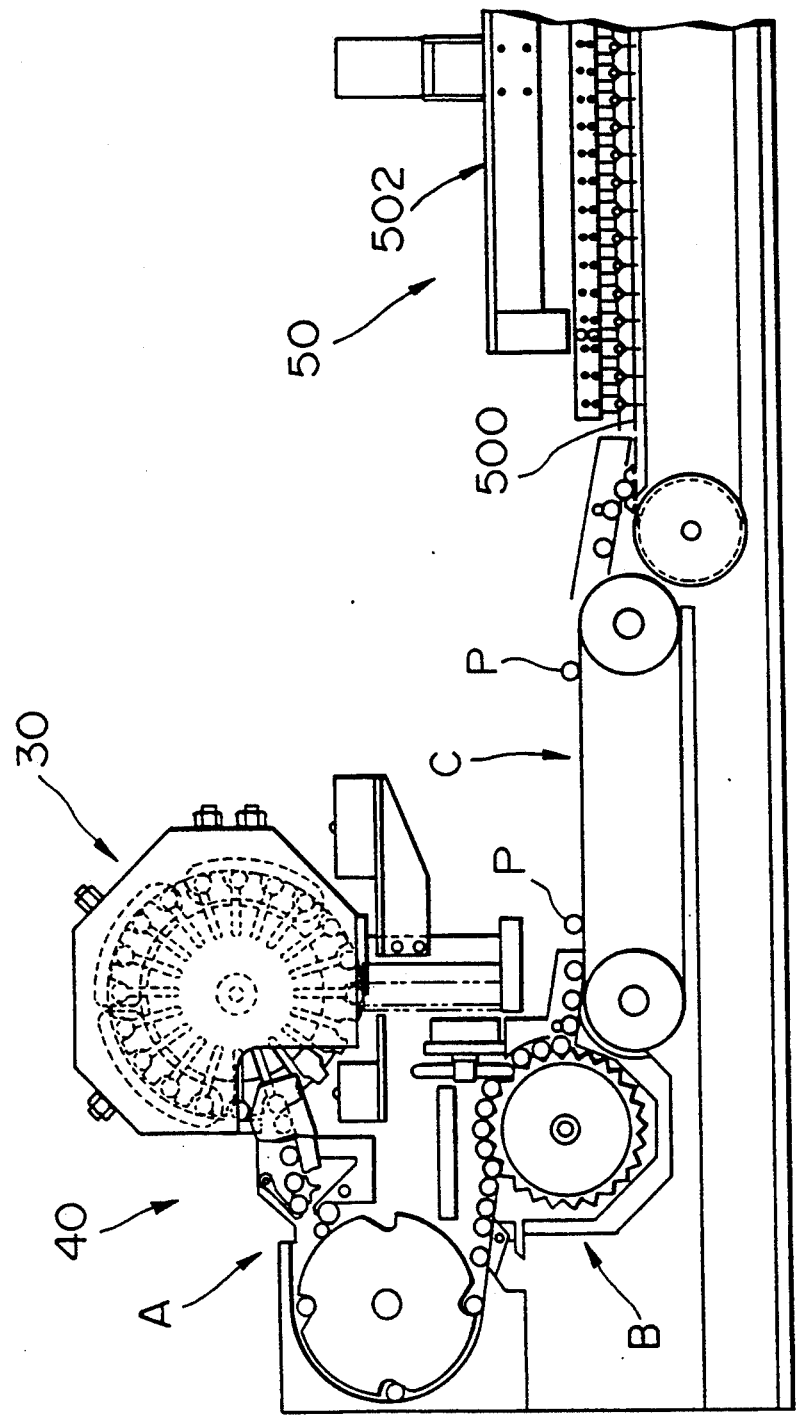
FIG. 23 is a second embodiment showing a variation in the order of surface quality inspection.

In a second embodiment representing a variation of the first embodiment, the arrangement of the pellet inspection section 40 may be that the side surface inspection section A is disposed before the end surface inspection section B as shown in FIG. 23.

In this embodiment, the pellet inspection section 40 is a continuous process facility, and a large number of accepted pellets are continuously discharged from the pellet inspection section 40. On the other hand, because the grip transporting device 502 is a batch-operated process, it is necessary that the collection belt 500, having twenty five pellets lined up thereon at certain spacing, be stopped temporarily.

When the collection belt 500 is stopped, many succeeding pellets become bunched at the entry end to the collection belt 500. Therefore, the succeeding pellets which are discharged from the pellet inspection section 40 may knock against the preceding pellets bunched at the entry end to the collection belt 500.

To reduce the shock impact, the rolling distance from the pellet inspection section 40 is minimized, but there is an addition device of a middle belt C (a flat stainless steel belt) is provided between the discharge end of the end surface inspection section B and the pellet transport device 50 for moderating the impact. Also, the speed of transport is adjusted to avoid impacting the preceding pellet with the succeeding pellets.

By such measures, the effect of mechanical damage to the inspected pellets is reduced if the collection belt 500 should stop.

What is claimed is:

1. A pellet drying apparatus for drying and redirecting a plurality of pellets of a short rod shape being transported for processing, said apparatus comprising:
   (a) a rotation disc of an approximately circular shape rotatable about a disc axis for redirecting each pellet of said plurality of pellets from an axial direction to a radial direction;
   (b) a plurality of pellet pockets formed on the outer periphery of said rotation disc for housing each pellet of said plurality of pellets; and
   (c) a plurality of gas circulation devices having a plurality of gas circulation paths communicating with said plurality of pellet pockets.

2. A pellet drying apparatus as claimed in claim 1, said apparatus further comprising: a pellet displacement monitor which determines changes in the position of the end surface of a pellet being transported in an axial direction; and a pellet transport control device for placing said pellet in a pellet direction change position so as to be housed in a pellet pocket of said rotation disc.

3. A pellet drying apparatus as claimed in claim 2, said apparatus further comprising: a control device for rotating said rotation disc through a specific angle when said pellet displacement monitor determines that said pellet has been placed in said pellet direction change position.

4. A pellet drying apparatus as claimed in claim 2, said apparatus further comprising: a pellet position sensor which determines that a pellet to be housed in said pellet pocket of said rotation disc has been disposed in said pellet direction change position; and a control device for rotating said rotation disc through a specific angle when said pellet displacement monitor determines that said pellet has been placed in said pellet direction change position.

5. A drying apparatus as claimed in claim 1, wherein said plurality of pellet pockets are equidistantly disposed on the circumferential periphery of said rotation disc.

6. A drying apparatus as claimed in claim 5, wherein a plurality of ratchet devices are provided between two neighboring pellet pockets equidistantly around said circumferential periphery with sharp teeth of said ratchet devices facing in the forward rotational direction of said rotation disc.

7. A drying apparatus as claimed in claim 1, wherein said plurality of gas circulation paths comprise a plurality of gas in-ports which direct a gas flow to end surfaces of said plurality of pellets.

8. A drying apparatus as claimed in claim 1, wherein said plurality of gas circulation paths comprise a plurality of gas out-ports so as to enable gas to sweep over the end surfaces of pellets.

9. A drying apparatus as claimed in claim 1, wherein said plurality of gas circulation paths comprise a plurality of gas in-ports which direct a gas flow to end surfaces of pellets; and a plurality of gas out-ports which exhaust gas from opposing end surfaces of said plurality of pellets; wherein said gas in-ports and said gas out-ports are disposed on both end covers of said rotation disc in the radial direction of said rotation disc, and perform intaking and exhausting of gas so as to alternatingly direct said gas flow to both end surfaces of said plurality of pellets.

10. A drying apparatus as claimed in claim 8, wherein each of said in-ports is provided with a gas passage groove having a length longer than a diameter of said end surface of the pellet.

11. A drying apparatus as claimed in claim 1, wherein said plurality of gas circulation paths comprise a plurality of outflow ports which direct air flow against the side surfaces of said plurality of pellets housed in said pellet pockets.

12. A drying apparatus as claimed in claim 11, wherein said outflow ports are aimed at a bottom region of said pellets housed in said pellet pockets.

13. An apparatus for arranging short cylindrical bodies, represented by pellets, each pellet having two end surfaces and a side surface and moving from upstream process to downstream process, comprising:
   (a) a pellet drying section comprising a rotation disc of an approximately circular shape rotatable about a disc axis for redirecting each of a plurality of pellets being transported from an axial direction to a radial direction; a plurality of pellet pockets formed on the outer periphery of said rotation disc for housing each pellet of said plurality of pellets in each of said plurality of pellet pockets; and a plurality of gas circulation devices having a plurality of gas circulation paths communicating with said plurality of pellet pockets.

(b) a pellet inspection section for recording surface conditions of said two end surfaces and said side surface of each of said plurality of pellets which have been dried in said pellet drying section and have been redirected from an axial direction to a radial direction, and for determining acceptance or rejection of each of said plurality of pellets based on recorded images;

(c) grip transporting devices for transporting a plurality of pellets which have been determined to be acceptable in said pellet inspection section;

(d) a visual confirmation section for visually inspecting the external appearance of said plurality of pellets transported by said grip transporting devices; and (e) a tray loading device for inserting a tray fully loaded with a plurality of pellets transported from said visual confirmation section by said grip transporting devices into a tray storage rack.

14. An apparatus as claimed in claim 13, said pellet inspection section comprising:

(f) an end-surface recording device which transports each of said plurality of pellets periodically, record end surface conditions of said two end surfaces and determines acceptance or rejection of each of said plurality of pellets; and (g) a side-surface recording device comprising a pellet rotation device having a small diameter roller rotating in the same direction and at the same peripheral speed as a proximally-disposed large diameter roller having pellet discharge pockets, for supplying each pellet of said plurality of pellets between said small diameter roller and said large diameter roller periodically, recording the side surface condition of the side surface of each pellet of said plurality of pellets, and determines acceptance or rejection of each pellet of said plurality of pellets based on an linearly translated image of said side surface of each pellet.

15. An apparatus as claimed in claim 13, said apparatus further comprising a vacuum suction device disposed between said small diameter roller and said large diameter roller.

16. An apparatus as claimed in claim 13, said apparatus further comprising a pellet collection device, disposed upstream of said pellet drying section, for collecting a plurality of pellets being transported horizontally, and a spacer device for separating a plurality of pellets being transported horizontally in close contact with each other.

17. An apparatus as claimed in claim 16, wherein said pellet collection device becomes activated when an operational problem arises in a downstream section of the pellet drying section.

* * * * *

UNITED STATES PATENT AND TRADEMARK OFFICE
CERTIFICATE OF CORRECTION

PATENT NO. : 5,323,433
DATED : June 21, 1994
INVENTOR(S) : Yoshitaka YAGINUMA, et al.

It is certified that error appears in the above-indentified patent and that said Letters Patent is hereby corrected as shown below:

On the title page, Item [73], the Assignee should read as follows:

--Mitsubishi Nuclear Fuel Co., Tokyo, Japan--

Also, on the title page, the Attorney, Agent, or Firm information should read as follows:

--Oblon, Spivak, McClelland, Maier & Neustadt--

Signed and Sealed this

Twenty-seventh Day of December, 1994

Attest:

BRUCE LEHMAN

Attesting Officer    *Commissioner of Patents and Trademarks*